(12) United States Patent
Prakash et al.

(10) Patent No.: US 11,803,871 B2
(45) Date of Patent: Oct. 31, 2023

(54) SYSTEMS AND METHODS FOR MACHINE LEARNING MODEL TO CALCULATE USER ELASTICITY AND GENERATE RECOMMENDATIONS USING HETEROGENEOUS DATA

(71) Applicant: ZS Associates, Inc., Evanston, IL (US)

(72) Inventors: Prakash, Bengaluru (IN); Gopi Vikranth Bandi, Seattle, WA (US)

(73) Assignee: ZS Associates, Inc., Evanston, IL (US)

( * ) Notice: Subject to any disclaimer, the term of this patent is extended or adjusted under 35 U.S.C. 154(b) by 0 days.

(21) Appl. No.: 17/545,221

(22) Filed: Dec. 8, 2021

(65) Prior Publication Data
US 2022/0180391 A1    Jun. 9, 2022

Related U.S. Application Data

(60) Provisional application No. 63/123,261, filed on Dec. 9, 2020.

(51) Int. Cl.
*G06Q 30/02* (2023.01)
*G06Q 30/0207* (2023.01)
(Continued)

(52) U.S. Cl.
CPC ..... *G06Q 30/0239* (2013.01); *G06Q 30/0205* (2013.01); *G06Q 30/0256* (2013.01); *G06Q 30/0283* (2013.01)

(58) Field of Classification Search
CPC .......... G06Q 30/0239; G06Q 30/0205; G06Q 30/0256; G06Q 30/0283
See application file for complete search history.

(56) References Cited

U.S. PATENT DOCUMENTS 9,208,444 B1 * 12/2015 Zheng ................ G06Q 30/0201
2005/0189414 A1 * 9/2005 Fano ...................... G06Q 30/02
705/14.27
(Continued)

FOREIGN PATENT DOCUMENTS

WO    WO-2018/170593 A1    9/2018

OTHER PUBLICATIONS

"Modeling the Distribution of Price Sensitivity and Implications for Optimal Retail Pricing" (Blattberg, Robert C. et al., published in Journal of Business and Economic Statistics, Feb. 1995) (Year: 1995).*
(Continued)

*Primary Examiner* — James M Detweiler
(74) *Attorney, Agent, or Firm* — Foley & Lardner LLP

(57) ABSTRACT

A method may include generating a feature table, hierarchical segments, and a graph network based on raw interaction data of a set of users. The method may further include generating a set of rankings for features in the feature table. The method may further include targeting hierarchical segments of the set of users through marketing campaigns and calculate a set of elasticity scores for the set of users in response to the marketing campaigns in the hierarchical segments. The method may further include generating item recommendations for the set of users based on the graph network. The method may further include executing a machine learning model to generate an uplift score for each user from the set of users based on at least one of the raw interaction data, the set of rankings, hierarchical segments, the set of elasticity scores, or the item recommendations.

20 Claims, 17 Drawing Sheets

1500

Generate a graph corresponding to a set of features extracted from a set of data associated with activities of a set of users. 1502

Calculate a set of elasticity scores for a subset of users within the set of users corresponding to a segment of the set of users responding to a targeted marketing campaign. 1504

Generate an item offer recommendation for at least a user within the subset of users. 1506

Execute a machine learning model to generate an uplift score for at least one user within the subset of users based on at least one of the graph, the set of data, or the set of elasticity scores. 1508

(51) Int. Cl.
  *G06Q 30/0204* (2023.01)
  *G06Q 30/0251* (2023.01)
  *G06Q 30/0283* (2023.01)

(56) References Cited

U.S. PATENT DOCUMENTS

| | | | | |
|---|---|---|---|---|
| 2007/0011224 | A1* | 1/2007 | Mena | G06Q 30/02 |
| | | | | 709/200 |
| 2010/0191570 | A1* | 7/2010 | Michaud | G06Q 30/02 |
| | | | | 705/14.27 |
| 2011/0131079 | A1* | 6/2011 | Valentine | G06Q 30/02 |
| | | | | 705/7.31 |
| 2012/0158474 | A1* | 6/2012 | Fahner | G06Q 30/0211 |
| | | | | 705/14.13 |
| 2016/0110442 | A1* | 4/2016 | Williams | G06F 16/9038 |
| | | | | 707/737 |
| 2016/0189207 | A1* | 6/2016 | Xu | G06Q 30/0277 |
| | | | | 705/14.48 |
| 2019/0205939 | A1 | 7/2019 | Lal et al. | |
| 2020/0134628 | A1* | 4/2020 | Jia | G06N 20/00 |
| 2020/0234365 | A1* | 7/2020 | Friedman | G06Q 10/067 |
| 2021/0334830 | A1* | 10/2021 | Lei | G06Q 10/04 |

OTHER PUBLICATIONS

European Search Report on EP Appln 21213565.1 dated Apr. 21, 2022.

* cited by examiner

Illustration of heterogeneous graph generation from transactional data

Choice Data at Customer x Item Level

| Cust ID | Date | Purchased Item ID | R1 | R2 | ... | R_n | Purchased Price | R1_Price | R2_Price | ... | Rn_price |
|---|---|---|---|---|---|---|---|---|---|---|---|
| C1 | 1/11/20 | I1 | I1 | I3 | ... | I5 | 1.6 | 1.6 | 1.5 | ... | 1.9 |
| C2 | 1/11/20 | I2 | I3 | I2 | ... | I4 | 2.5 | 1.9 | 2.5 | ... | 3.0 |
| C3 | 1/11/20 | I6 | I6 | I1 | ... | I5 | 1.8 | 1.8 | 1.6 | ... | 1.9 |

701

Customer summary data at Customer x Item x Category level

| Cust ID | Date | Item ID | Category ID | Feature 1 | ... | Feature 2 | Base Price | Price |
|---|---|---|---|---|---|---|---|---|
| C1 | 1/11/20 | I1 | Cat_001 | | | | | |
| C2 | 1/11/20 | I2 | Cat_002 | | | | | |
| C3 | 1/11/20 | I3 | Cat_001 | | | | | |

702

Score distribution at Customer x Product Category level

| Cust ID | Category ID | Score |
|---|---|---|
| C1 | Cat_001 | 0.22 |
| C2 | Cat_002 | 0.70 |
| C3 | Cat_001 | 0.63 |

Generate a graph corresponding to a set of features extracted from a set of data associated with activities of a set of users. 1502

Calculate a set of elasticity scores for a subset of users within the set of users corresponding to a segment of the set of users responding to a targeted marketing campaign. 1504

Generate an item offer recommendation for at least a user within the subset of users. 1506

Execute a machine learning model to generate an uplift score for at least one user within the subset of users based on at least one of the graph, the set of data, or the set of elasticity scores. 1508

FIG. 15

SYSTEMS AND METHODS FOR MACHINE LEARNING MODEL TO CALCULATE USER ELASTICITY AND GENERATE RECOMMENDATIONS USING HETEROGENEOUS DATA

CROSS-REFERENCE TO RELATED APPLICATIONS

This application claims the benefit of and priority to U.S. Provisional Patent Application No. 63/123,261, filed Dec. 9, 2020, which is incorporated herein by reference in its entirety for all purposes.

TECHNICAL FIELD

The present disclosure relates to the field of artificial intelligence and knowledge processing systems for calculating a user's elasticity and identifying product offers relevant to the user based on data collected from heterogeneous data sources.

BACKGROUND

To generate predictions and recommendations, some entities use conventional recommendation methods to analyze customer/user data, such as online marketing campaigns, clinical trials, targeting potential customers, political campaigns, and the like. Conventionally, a group of experts extrapolates and predicts a particular user behavior by analyzing previous behavior of users within particular segments (e.g., having similar attributes). However, these methods are highly unreliable because they depend on the experts' subjective skills and understanding. To improve these conventional methods, some utilize artificial intelligence (AI) and machine learning models to analyze user data and predict recommendations algorithmically. Some existing AI-backed recommendation methods and apparatus, however, do not effectively process data to generate recommendations and assess the elasticity of users. For instance, due to the data being collected from disparate data sources and being heterogeneous in content, format, and type, AI-backed methods are not efficient, may require high processing power, and may not yield accurate results.

SUMMARY

For the aforementioned reasons, there is a need to improve AI-enabled methods of analyzing heterogeneous data. Using the methods and systems discussed herein, an end-user can select a strategy (e.g., marketing campaign or item offer) to be analyzed by an AI-backed prediction system. For instance, the end-user can instruct the system to increase the rate at which rewards (e.g., loyalty rewards) are being earned and requests the system to identify how increasing rewards would affect their customer base. As a result, the system may identify the customers that would be affected (referred to herein as segments) and may identify how they would be affected (e.g., whether they would react positively or negatively to a change in price or addition of reward accumulation policy). The system can then visually present the results for the end-user.

In an embodiment, a method comprises generating, by a processor, a graph corresponding to a set of features extracted from a set of data associated with activities of a set of users; calculating, by the processor, a set of elasticity scores for a subset of users within the set of users corresponding to a segment of the set of users responding to a targeted marketing campaign; generating, by the processor, an item offer recommendation for at least a user within the subset of users; and executing, by the processor, a machine learning model to generate an uplift score for at least one user within the subset of users based on at least one of the graph, the set of data, or the set of elasticity scores.

The set of data may comprise at least one of user transactional data, campaign data, marketing touchpoint data, loyalty information, geographical data, behavioral data, user segments, or de-identified user-encoding data.

The set of data may correspond to heterogeneous data including at least one of multiple data types or originating from one or more data sources.

A number of the segments may be received from a client computing device.

An attribute of the segments is received from a client computing device.

The set of elasticity scores may be used to calculate a threshold for identifying the segments.

The uplift score may indicate an impact of the targeted marketing campaign on at least one user.

The method may further comprise ranking, by the processor, each feature within the set of features, wherein the processor uses a subset of the set of features in accordance with their respective ranking to generate the graph.

The method may further comprise presenting, by the processor for display on a user interface, a graphical indication of a distribution of elasticity score among at least a portion of the set of users.

The method may further comprise presenting, by the processor for display on a user interface, a graphical indication of a distribution of uplift scores among at least a portion of the set of users.

In another embodiment, a computer system comprises a server having at least one processor configured to generate a graph corresponding to a set of features extracted from a set of data associated with activities of a set of users; calculate a set of elasticity scores for a subset of users within the set of users corresponding to a segment of the set of users responding to a targeted marketing campaign; generate an item offer recommendation for at least a user within the subset of users; and execute a machine learning model to generate an uplift score for at least one user within the subset of users based on at least one of the graph, the set of data, or the set of elasticity scores.

The set of data may comprise at least one of user transactional data, campaign data, marketing touchpoint data, loyalty information, geographical data, behavioral data, user segments, or de-identified user-encoding data.

The set of data may correspond to heterogeneous data including at least one of multiple data types or originating from one or more data sources.

A number of the segments may be received from a client computing device.

An attribute of the segments may be received from a client computing device.

The set of elasticity scores may be used to calculate a threshold for identifying the segments.

The uplift score may indicate an impact of the targeted marketing campaign on at least one user.

The least one processor may be further configured to rank each feature within the set of features, wherein the processor uses a subset of the set of features in accordance with their respective ranking to generate the graph.

At least one processor may be further configured to present, for display on a user interface, a graphical indication of a distribution of elasticity score among at least a portion of the set of users.

At least one processor may be further configured to present, for display on a user interface, a graphical indication of a distribution of uplift scores among at least a portion of the set of users.

BRIEF DESCRIPTION OF THE DRAWINGS

FIG. 7 illustrates data structures for choice, customer, and score distribution datasets, according to an embodiment.

FIG. 15 is a flowchart illustrating a method of generating a recommendation, according to an embodiment.

DETAILED DESCRIPTION

Non-limiting examples of various aspects and variations of the embodiments are described herein and illustrated in the accompanying drawings.

One or more embodiments described herein generally relate to methods and apparatus for dynamically processing heterogeneous data (e.g., data from different sources, in different formats, and/or the like). The heterogeneous data can include structured and/or semi-structured data. In particular, apparatus, methods, and systems described herein process and extract features from the heterogeneous data. In some instances, the heterogeneous data can include the user's raw interaction data, transactional data, campaign data, marketing touchpoint, loyalty information, user segmentation, electronic health record, financial data, and/or the like. In some instances, the heterogeneous data can be in time series data, stationary data, non-stationary-data, linear data, non-linear data, seasonal data, periodic data, chaotic data, univariate data, multivariate data, and/or the like. The heterogeneous data can be high-dimensional, high volume, and/or rich in details. In some embodiments, the methods and apparatus can be configured to process de-identified image encoding and/or vector representation of the heterogeneous data.

Described herein are recommendation devices that use suitable models for processing heterogeneous data described above for generating recommendations and/or evaluating user elasticity. In particular, one or more recommendation devices described herein can be configured to use a genetic algorithm model, a heterogeneous graph convolution network, a hierarchical tessellation, a neural network model, and/or a procedural program to generate recommendations and calculate elasticity scores for users.

Figure 1:
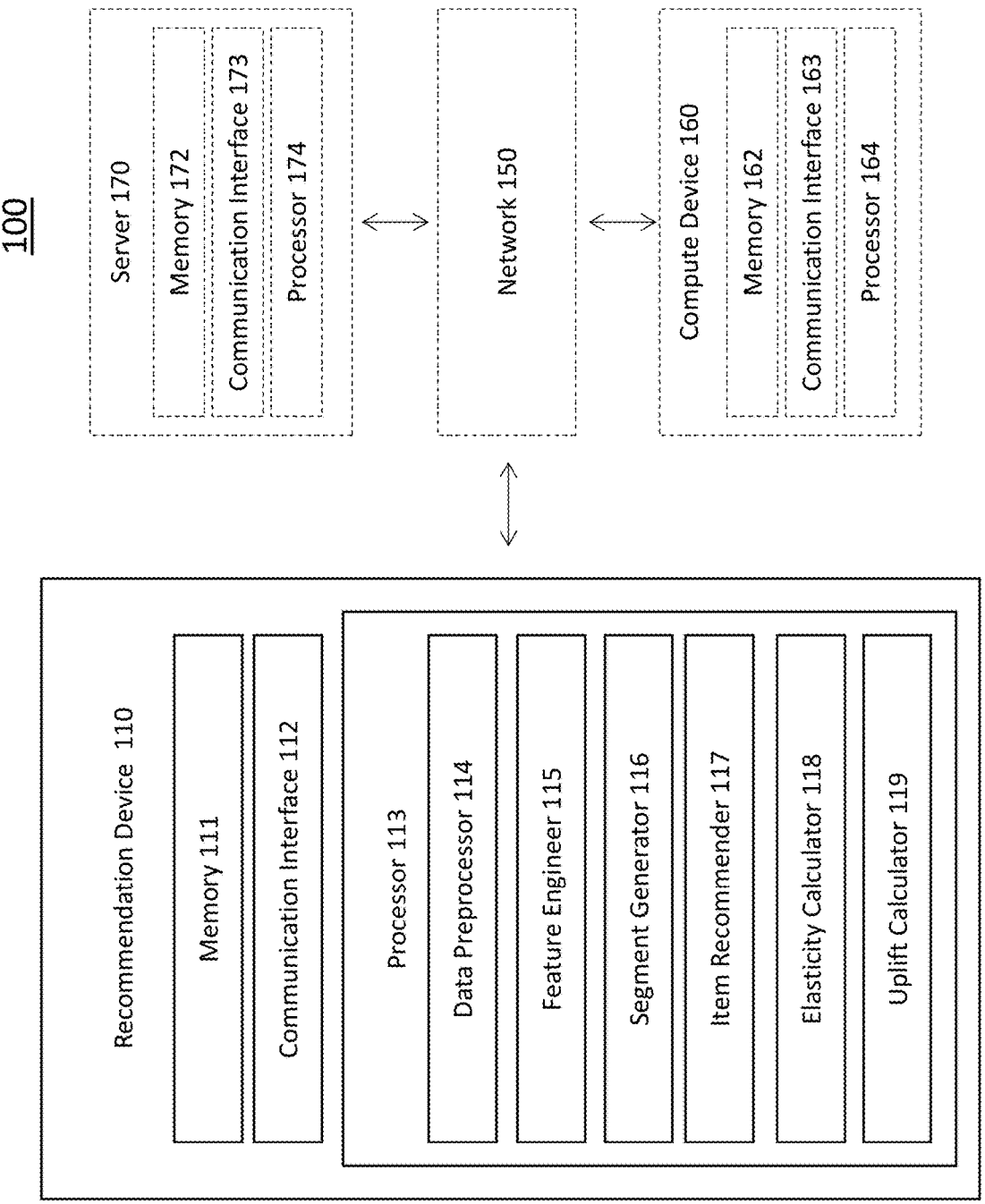
FIG. 1 is a schematic illustration of a recommendation system, according to an embodiment.

While the methods and apparatus are described herein as processing heterogeneous data from a set of files, a set of tables, a set of documents, a set of databases, a set of data streams, and/or the like, in some instances a recommendation device (e.g., recommendation device 110 as shown and described herein with respect to FIG. 1) can be used to generate the set of files, the set of tables, the set of documents, the set of databases, the set of data streams, and/or the like. Therefore, the recommendation device can be used to process and/or generate any collection or stream of data, events, and/or objects. As an example, the recommendation device can process and/or generate any string(s), number(s), image(s), video(s), executable file(s), dataset(s), Uniform Resource Locator (URL), global positioning system (GPS) data, name(s), address(es), telephone number(s), email address(es), and/or the like. For further examples, the recommendation device can be used to execute or process an application programming interface (API), a function(s) of a software code(s), a webpage(s), a data file(s), a data stream(s), a model file(s), a source file(s), a script(s), a table(s) in a database system, a document-processing macro(s), an e-mail message(s), a text message(s), and/or the like.

FIG. 1 is a schematic illustration of a recommendation system 100, according to an embodiment. The recommendation system 100 can be used to evaluate a user's elasticity and generate recommendations for the user and based on heterogeneous data (e.g., financial data, behavioral data, demographic data, and/or the like) about the user. The user's elasticity may be used to generate recommendations for the user. The recommendation system 100 can include a recommendation device 110 (also referred to as 'the personalize artificial intelligence device'), a computing device 160, and/or a server 170. The recommendation device 110, the computing device 160, and/or the server 170 can be operatively coupled to each other via a network 150. The recommendation device 110 includes a memory 111, a communication interface 112, and a processor 113.

The memory 111 of the recommendation device 110 can be, for example, a memory buffer, a random access memory (RAM), a read-only memory (ROM), a hard drive, a flash drive, a secure digital (SD) memory card, a compact disk (CD), an external hard drive, an erasable programmable read-only memory (EPROM), an embedded multi-time programmable (MTP) memory, an embedded multimedia card (eMMC), a universal flash storage (UFS) device, and/or the like. The memory 111 can store, for example, one or more software modules and/or code that includes instructions to cause the processor 113 to execute one or more processes or functions (e.g., a data preprocessor 114, a feature engineer 115, a segment generator 116, an item recommender 117, an elasticity calculator 118, and/or an uplift calculator 119).

The communication interface 112 of the recommendation device 110 can include a software component (e.g., executed by processor 113) and/or a hardware component of the recommendation device 110 to facilitate data communication between the recommendation device 110 and external devices (e.g., the computing device 160, the server 170, and/or the like) or internal components of the recommendation device 110 (e.g., the memory 111 and/or the processor 113). The communication interface 112 can be operatively coupled to and used by the processor 113 and/or the memory 111. The communication interface 112 can be, for example, a network interface card (NIC), a Wi-Fi™ module, a Bluetooth® module, an optical communication module, and/or any other suitable wired and/or wireless communication interface.

The communication interface 112 can be configured to connect the recommendation device 110 to the network 150, as described in further detail herein. In some instances, the communication interface 112 can facilitate receiving and/or transmitting data via the network 150. More specifically, in some implementations, the communication interface 112 can facilitate receiving and/or transmitting heterogeneous data (e.g., raw interaction data) and/or models (e.g., feature engineer 115, elasticity calculator 117 and/or the like) through the network 150 from/to the computing device 160 and/or the server 170.

The processor 113 can be, for example, a hardware-based integrated circuit (IC) or any other suitable processing device configured to run or execute a set of instructions or a set of code. For example, the processor 113 can include a general-purpose processor, a central processing unit (CPU), an accelerated processing unit (APU), an application-specific integrated circuit (ASIC), a field-programmable gate array (FPGA), a programmable logic array (PLA), a complex programmable logic device (CPLD), a programmable logic controller (PLC), a graphics processing unit (GPU), a neural network processor (NNP), and/or the like. The processor 113 can be operatively coupled to the memory 111 and/or the communication interface 112 through a system bus (for example, address bus, data bus, and/or control bus, not shown).

The processor 113 can include a data preprocessor 114, a feature engineer 115, a segment generator 116, an item recommender 117, an elasticity calculator 118, and/or an uplift calculator 119, each of which can include software stored in the memory 111 and executed by the processor 113. For example, code to cause the data preprocessor 114 to fetch/process the heterogeneous data can be stored in the memory 111 and executed by the processor 113. Alternatively or in addition, each of the data preprocessor 114, the feature engineer 115, the segment generator 116, the item recommender 117, the elasticity calculator 118, and the uplift calculator 119 can be or include a hardware-based device. For example, a process to cause the elasticity calculator 118 to generate an elasticity score for a user can be implemented on an individual integrated circuit chip (e.g., an FPGA, an ASIC, etc.).

The data preprocessor 114 can be used to receive the heterogeneous data (e.g., including multiple data types received from multiple sources) from the memory 111, the server 170, and/or the computing device 160 and generate a vast candidate feature space. In some instances, the heterogeneous data can include a user's journey or history data, in-store visit data, promotion data, clickstream data, financial transaction data, medical data, social media data, behavioral data, and/or the like.

Preprocessing the data using the data preprocessor 114 can involve normalizing the heterogeneous data, extracting features, finding a frequency of occurrence of the features, and/or using data aggregators, to generate the vast candidate feature space from the heterogeneous data. In some instances, the data preprocessor 114 can be configured to extract the features in the heterogeneous data based on a set of preset rules, events, time periods, objectives, attributes, and/or the like. For example, the data preprocessor 114 can be configured to search for a preset pattern in the heterogeneous data recorded at a certain time interval and extract the pattern as a feature. In some instances, the data preprocessor 114 can be configured to profile the features. In some instances, the profiled features can be prepared to be used by the feature engineer 115, the segment generator 116, the item recommender 117, elasticity calculator 118, and/or the uplift calculator 119.

In some instances, the data preprocessor 114 can normalize the heterogeneous data to one or more common scales. Normalization can involve transforming the heterogeneous data into one or more common formats to improve the cross-compatibility of the heterogeneous data and/or features of the heterogeneous data among various modules of the recommendation device 110. In some examples, the data preprocessor 114 can format a subset of textual data from the heterogeneous data to a common character format such as American Standard Code for Information Interchange (ASCII) format, Unicode format, and/or the like. In some examples, the data preprocessor 114 can format a subset of numerical data from the heterogeneous data to a common data format such as float, integer, and/or the like. In some instances, the data preprocessor can use data aggregators such as a recency aggregator(s), a frequency aggregator(s), a change in frequency aggregator(s), and/or the like.

Figure 4A:
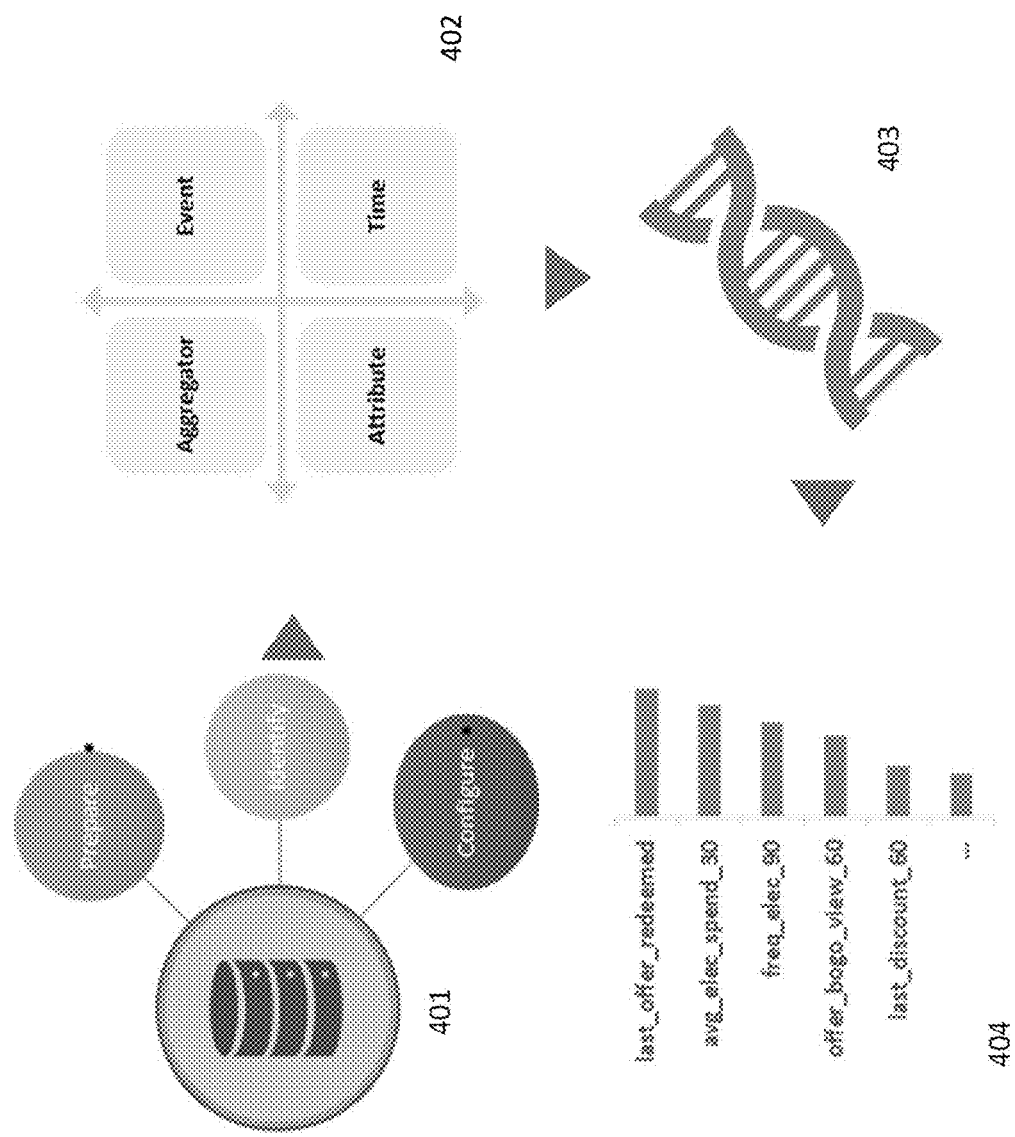
FIG. 4A is a schematic illustration of generating and ranking features from heterogeneous data, according to an embodiment.

The feature engineer 115 can be used to select and/or generate features and generate a feature table from the vast candidate feature space. The feature engineer 115 can include code stored in the memory 111 to instruct the processor 113 to access the preprocessed data, generate a feature table, and store the feature table. FIG. 4A is a schematic illustration of generating and ranking features from heterogeneous data using the feature engineer 115. Specifically, as shown in FIG. 4A, the feature engineer 115 can prepare and configure heterogeneous data and identify features in the heterogeneous data, at 401.

The feature engineer 115 can then use data aggregators, at 402, on the features to generate aggregated features. The data aggregators can include functions, operators, models, and/or objects that roll up and/or aggregate features based on a criterion (e.g., recency, frequency, etc.). For example, the data aggregators can include a recency aggregator that indicates a time since the last occurrence of a feature. In another example, the data aggregators can include a count aggregator that indicates the number of occurrences of a feature in a predetermined and/or selected time interval. In another example, the data aggregators can include a delta count aggregator that indicates a difference in the number of occurrences of a feature in a first time period compared to a number of occurrences of a feature in a second time period.

Figure 4B:
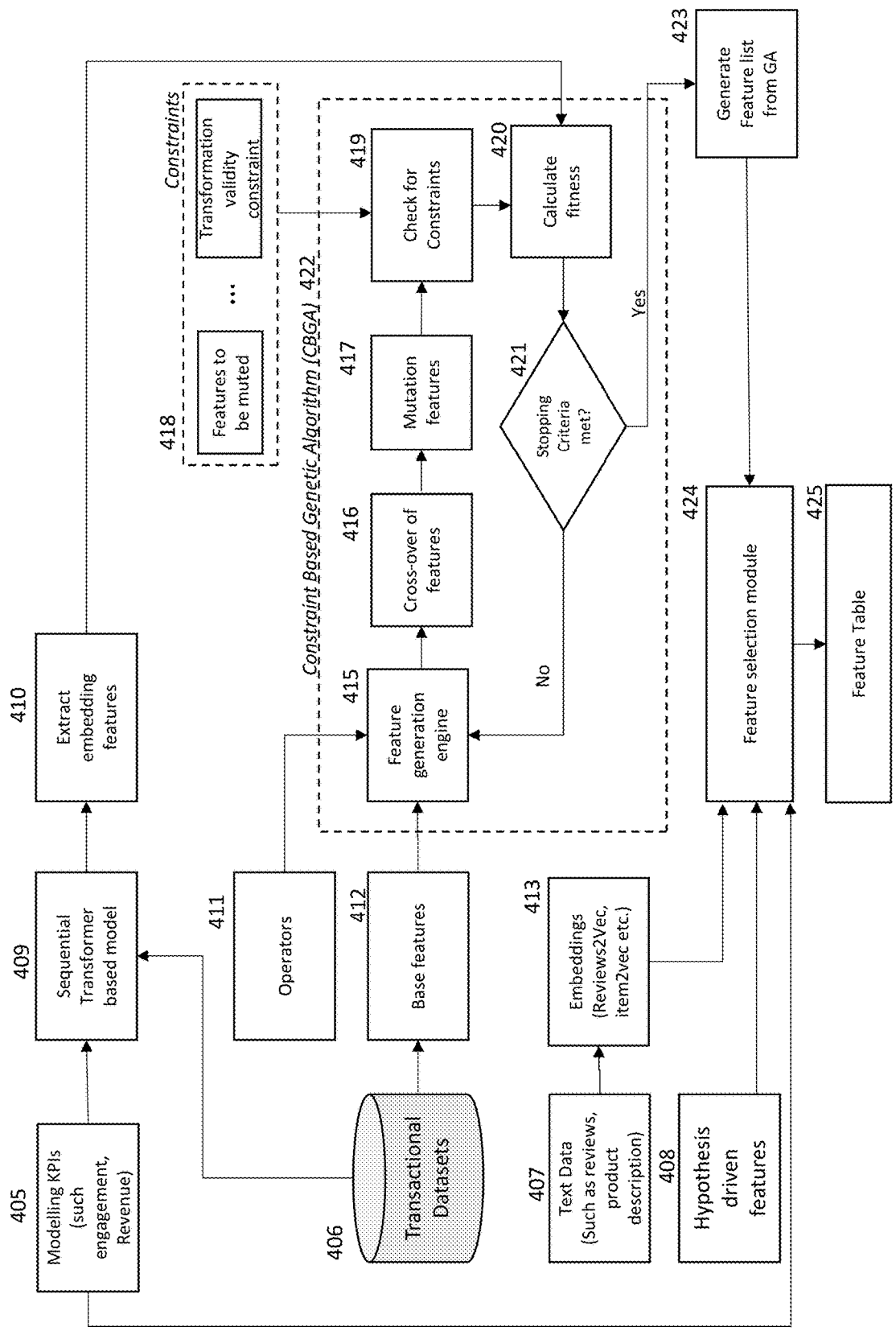
FIG. 4B is a flowchart illustrating generating and ranking features from heterogeneous data, according to an embodiment.

The feature engineer 115 can perform the processes described with respect to FIG. 4B. Specifically, the feature engineer 115 uses transactional data 406 (e.g., transaction history of a user or group of uses), text data 407 (e.g., reviews and/or product descriptions converted to embeddings), and/or hypothesis-based features 408, which can include rule-based or domain-related features (e.g., Charlson index, which can capture customer severity in the insurance industry, revenue deciles, etc.) and can be pre-defined and configured by a user. Based on Modelling key performance indicators (KPIs) 405 selected by a user, a sequential transformer-based model 409 (e.g., a sequential BERT-based architecture and/or the like) is executed. The embedding feature from a previous layer of the model is extracted, at 410, and used to identify explainable features using a constraint-based genetic algorithm (CBGA), at 403, as shown in FIG. 4A, and at 422, as shown in FIG. 4B, on the aggregated features to select or generate a feature list, at 423.

The CBGA, at 422, includes feature generation engine 415, which integrates operator and base features together to define and/or create new features under and/or using pre-defined constraints 418 such as, for example, transformation operators (e.g., log, exponential, etc.). For example, the base features 412 and operators 411 are provided to the feature generation engine 415 to define and/or create such new features. In some implementations, such transformation operators are not applied to categorical variables (e.g., gender, location, etc.). Similarly, other constraints such as feature validity constraints (e.g., muted events) are not used as part of the feature generation engine 415 or used to derive other features. In some implementations, a derived feature from feature generation engine 415 can be referred to as a chromosome.

A chromosome derived by the feature generation engine 415 can be provided to identify crossover and/or overlap of features from previous iterations of the CBGA, at 416, and then to mutate features, at 417. The crossover of features, at 416, and mutation of features, at 417, are performed on randomly selected chromosomes with a defined crossover and mutation probability to generate new chromosomes. The crossover and mutation probabilities can be selected to maximize the exploration and/or exploitation capability of the CBGA. The probabilities can be optimized and/or pre-set/predefined based on observed convergence and performance of the CBGA on defined probabilities for a given use-case. Both the identification of crossover of features, at 416, and mutation of features, at 417, are checked for constraint satisfaction, at 419, which ensures that any newly generated chromosomes satisfy the constraints defined at 418. The CBGA, at 420, can calculate the fitness of the features, at 420. The CBGA, at 403 in FIG. 4A and 422 in FIG. 4B, can then use any suitable stopping criteria, at 421, after calculating the fitness of the features, at 420, such as, for example, a maximum number of generations, a fitness threshold, and/or the like.

In use, the CBGA, at 403 in FIG. 4A and 422 in FIG. 4B, searches the vast candidate feature space, evaluates the fitness of the features to select the fittest and/or applicable features, and generates subsequent features based on crossover and mutations of each iteration of the CBGA algorithm, at 403 in FIG. 4A and at 422 in FIG. 4B. The fitness of the features can be calculated, at 420, using a fitness function. In some implementations, the fitness function can be a multi-objective function that uses an objective function to identify, for example, differences in covariance structures of extracted embedding features, at 410, that were generated using a non-linear sequential transformer-based model, at 409. In some implementations, the fitness function can identify a correlation between a generated feature and a response, and/or the like.

When a stopping criterion is not met, at 421, the CBGA 422 can iterate on the features, returning the features to the feature generation engine, at 415. When a stopping criterion is met, at 421, the feature engineer 115 can generate the feature list, at 423, which is merged, at 424, with other features such as review embeddings of the text data 407 (e.g., generated using natural language processing (NLP) at 413) or the hypothesis-driven features 408 at feature selection module 424, which can run and/or execute pre-configured models such as, for example, boosting tree-based models (e.g., extreme gradient boosting (XGBOOST) models, light gradient boosting machines (LGBM), etc.) to generate a final feature table 425.

In some instances, features in the feature table 425 can be ranked by importance to generate a ranked feature table, at 404. For example, age, sex, ethnicity, annual income, last offer redeemed, and frequency of clicking on advertisements on a mobile phone can be selected or generated as relevant features for selecting and displaying an advertisement or offer on a computing device of a user. Each of the relevant features can be ranked by importance to the user for the offer. For example, an order of importance for the user can be (a) frequency of clicking on advertisements on the mobile phone, (b) annual income, (c) last offer redeemed, (d) age, (e) sex, and (f) ethnicity. The order of importance can then be used to provide the offer and/or calculate an elasticity score for the user, as described herein. In some implementations, the recommendation device 110 can use any other suitable model and/or classifier.

Figure 8:
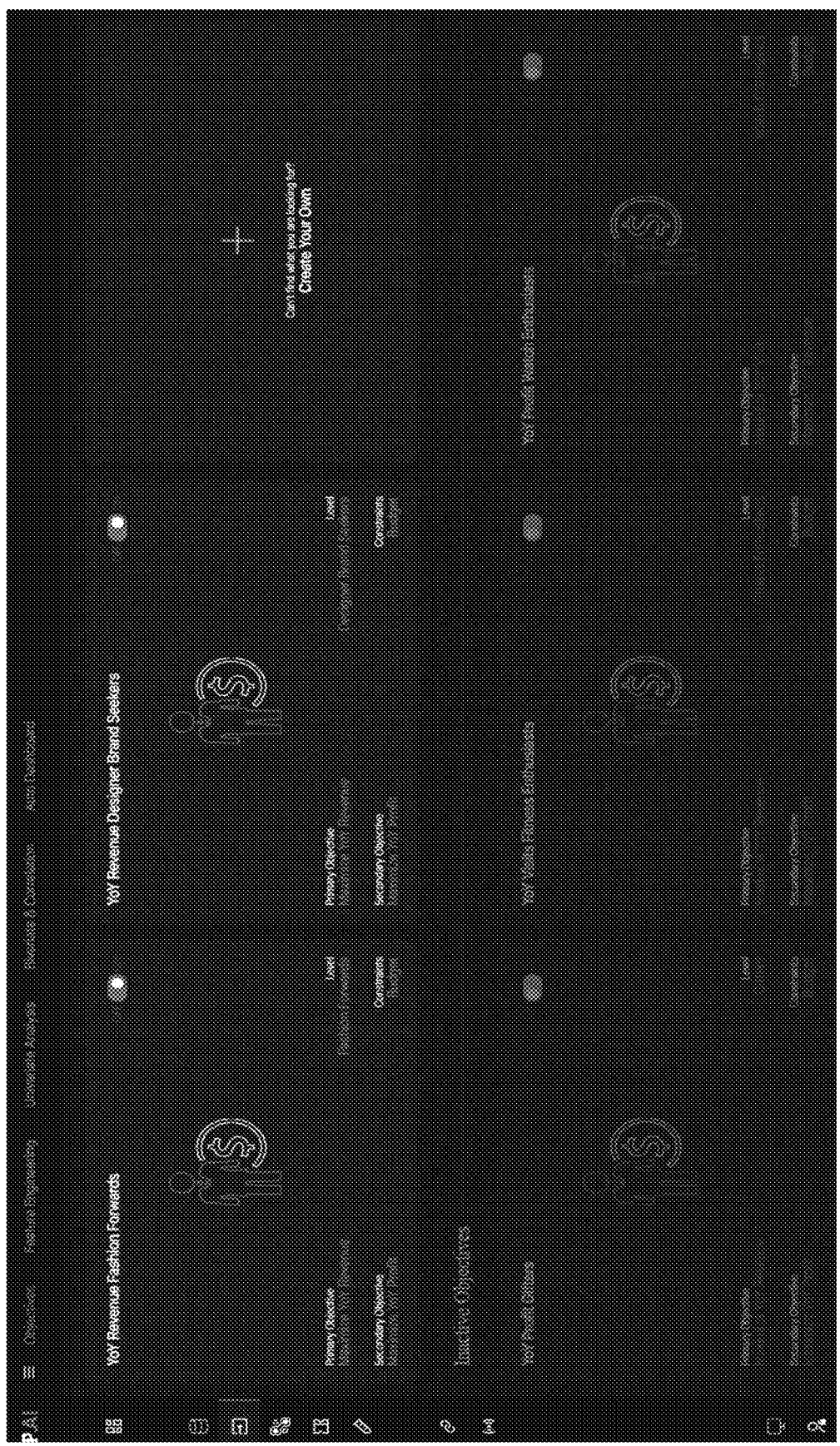
FIG. 8 is an illustration of a configuration screen to set objectives, define metrics, define customers to target, and provide additional constraints, according to an embodiment.
Figure 9:
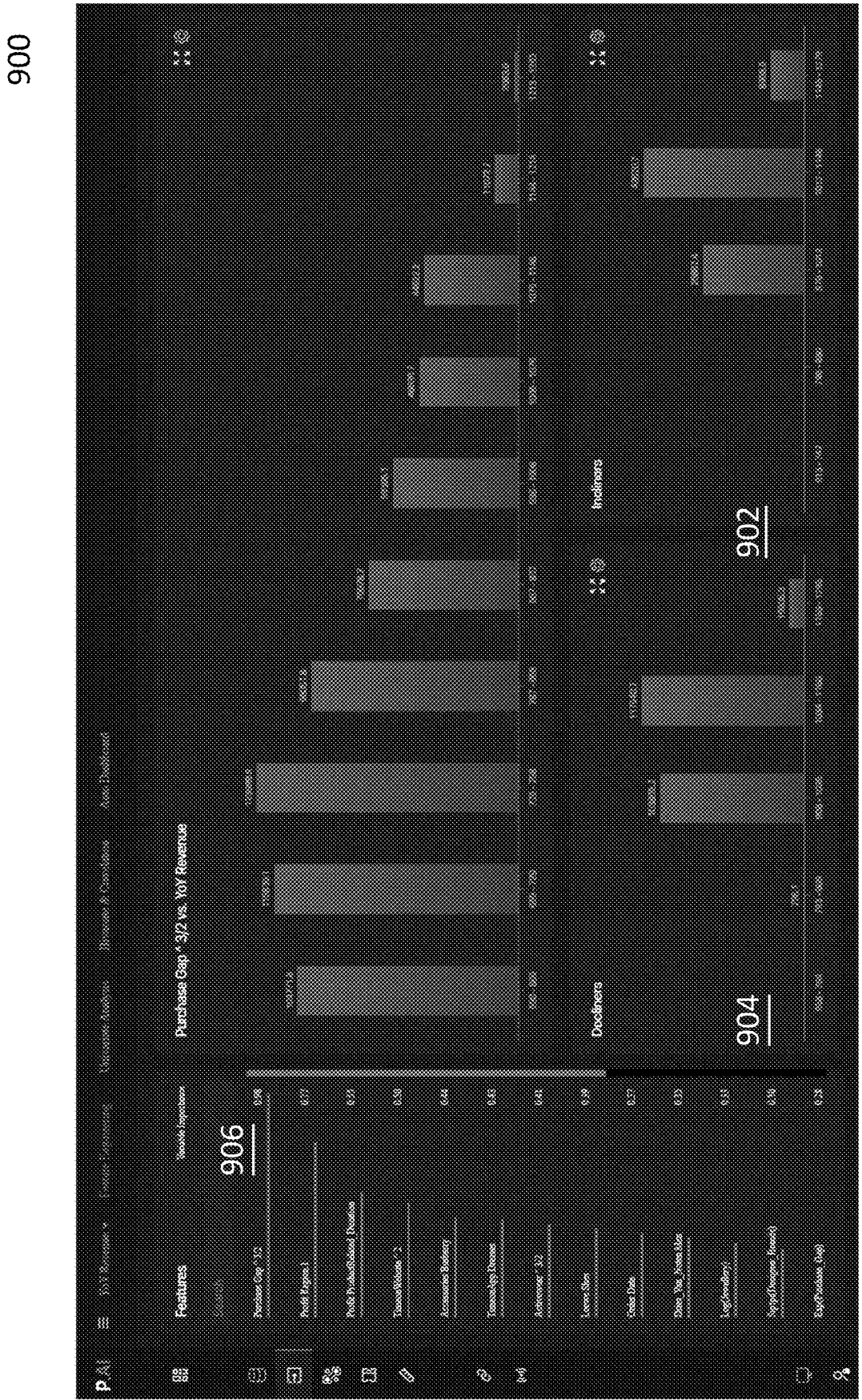
FIG. 9 is an illustration of a user interface showing an output of a feature engineer, according to an embodiment.

FIG. 9 illustrates an output of the feature engineer 115. The user interface 900 shows a summary of features generated by feature engineer 115 and their importance. The features can be muted during analysis, which can be used as a constraint in subsequent analyses, and/or feature identification and summaries can be updated accordingly. For example, FIG. 9 shows summaries of a feature transformed to a response variable based on purchase gap with respect to year-on-year (YOY) revenue, which was inputted by the user (e.g., using input elements depicted in FIG. 8). Moreover, in some implementations, summaries can be published at various defined segment levels such as, for example, incliners, decliners, stable, etc.

As illustrated, the user interface 900 includes a graphical component that describes the incliner and decliners. As used herein, an incliner or a decliner may refer to a customer's propensity to increase or decrease their activity (e.g., life cycle). In the embodiment where the end-user is analyzing a purchase propensity, an incliner may refer to an existing customer who is likely to increase their purchase (e.g., spend more money to purchase more clothes) and a decliner is a customer who would decrease their activity (e.g., the customer spent $500 on services last quarter but now is likely to spend less than $500). Certain users may be segmented into "stable," which may indicate that those users may not change their behavior. The user interface 900 may include a graph depicting incliners (904) and decliners (902).

Incliners and decliners may be a first-level classification of the users. In some other embodiments, the system may further classify the users based on a secondary behavior (or predicted behavior). For instance, the system may further divide the incliners into incliners who are purchasing for their family and incliners who are purchasing for themselves. The system may continuously divide the users into different segments until it reaches a unique cohort of users for which a marketing intervention can be implemented.

The user interface 900 may also depict features that were previously generated (906). In some configurations, such as the depicted embodiment, the system may identify each features' corresponding rank.

The user interface 900 may display the values divided into different bins. As discussed herein, the system may generate features based on user data to analyze user data and generate recommendations. The system may use these features to place different customers into different bins. Therefore, the values depicted in the user interface may be calculated for users that satisfy a particular criterion with respect to their features. For instance, the decliners 902 are depicted for different groups of customers. As a result, the end-user can identify a group of customers who would be negatively impacted and a group of customers who would not be negatively impacted.

The segment generator 116 can receive user interaction data across multiple touchpoints of users to identify user segments. The segment generator 116 can segment users based on objectives (e.g., business objectives) such as, for example, maximizing revenue growth, an impact on revenue, maximizing profit, maximizing reach among a target group (e.g., demographics), and/or the like. As illustrated, the recommendation system (also referred to herein as the system) may provide a user interface for the end-user having various input elements configured to receive one or more attributes from the end-user that can be used to segment the users. For instance, the system may display user interface 800 (FIG. 8) having various graphical components and input elements.

FIG. 8 is an illustration of a configuration screen to set objectives, define metrics to optimize, define customers to target, and provide additional constraints. For example, as shown in FIG. 8, an example objective can be inputted by an end-user to be Year-over-Year (YoY) Revenue Fashion Forwards with a primary objective of maximizing YoY revenue and a secondary objective of maximizing YoY profit (e.g., graphical components. A constraint can be the budget and the level of execution for the objective can be fashion forwards (e.g., targeting users who are seen as fashion-forward). As shown in FIG. 8, other objectives with different primary objectives, secondary objectives, constraints, and levels can be defined by the end-user. The system may use these inputs to segment the users accordingly.

Figure 10:
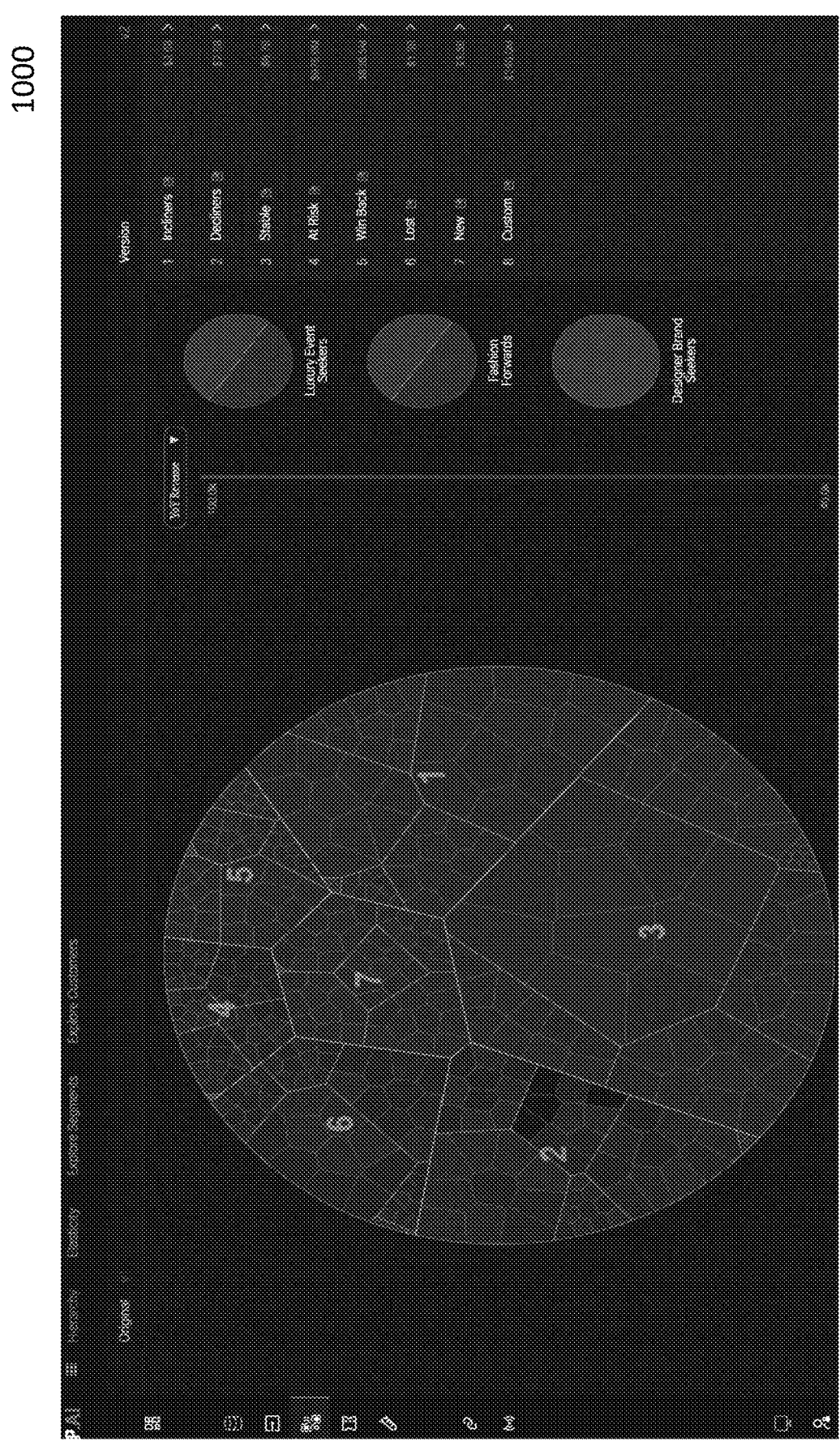
FIG. 10 is an illustration of a user interface showing a hierarchical tessellation-based segmentation output, according to an embodiment.

To achieve segmenting the users based on the objectives, the segment generator 116 can use a hierarchical tessellation (e.g., Hierarchical Voronoi Tessellation (HVT)) to identify user segments. Hierarchical tessellation can be constructed using multi-dimensional scaling to a two-dimensional scale. FIG. 10 (user interface 1000) illustrates an example of a hierarchical tessellation-based segmentation output. Classified users (e.g., luxury event seekers, fashion forwards, designer brand seekers, etc.) can be segmented into various segments (e.g., incliners, decliners, stable, at risk, win back, lost, new, customer, etc.).

Such segments can be defined based on a predefined and/or selected response and/or parameter such as, for example, revenue, engagement, churn, etc. when analyzed in view of a classification. Incliners, decliners, and stable segments can be tagged based on a revenue response metric indicating increasing, decreasing, and constant revenue, respectively. Similarly, the at-risk segment can be identified based on a churn response and a new customer segment can be identified for newly added and/or newly tracked customers. A win-back segment can include customers who were previously classified and/or tracked, were removed, but have recently been tracked again.

In some instances, the segment generator 116 can use the heterogeneous data and/or the feature table to generate the user segments. Therefore, the segment generator 116 can be configured to conveniently generate dynamic custom user segments from a user interface (UI) based on consumer performance on business metrics. The recommendation device 110, the computing device 160, and/or the server 170 can use the user segments to target elastic users (e.g., customers) through marketing campaigns.

Figure 5A:
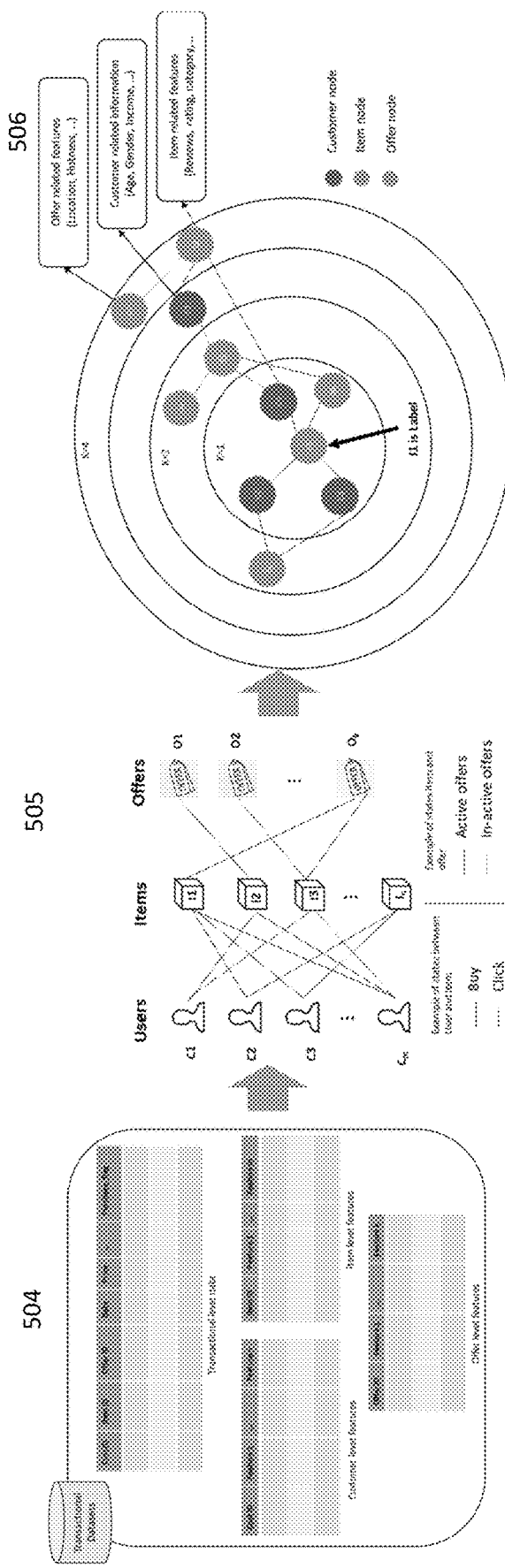
FIG. 5A is a schematic illustration of generating a heterogeneous graph convolution network, according to an embodiment.

The item recommender 117 can incorporate features from the feature table at individual and item levels (e.g., features related to a specific customer, features related to a specific item, and/or the like) as node embeddings of a heterogeneous 506 convolution network (shown in FIG. 5A) and generate personalized item recommendations (e.g., item-offer pairwise recommendations) in a scalable and speedy fashion. In some instances, the heterogeneous graph convolution network 506 can be constructed based on the feature table 504 (including transactional datasets (similar to those described at 406 in FIG. 4B) including transactional level data, customer level features, item-level features, and offer level features) and capture relevance across users, items and offers 505 (e.g., based on a user viewing/clicking on an item or buying an item, and active and inactive offers) in a single graph by leveraging a node embedding neighborhood, as shown in FIG. 5A. The nodes in the heterogeneous graph convolution network 506 can include customer nodes ($C_1$-$C_n$), offer nodes ($O_2$-$O_k$), and item nodes ($I_1$-$I_n$). The offer nodes can include offer-related features (e.g., offer location, offer "hotness" or immediacy, etc.). The customer nodes can include customer-related information (e.g., age, gender, income, demographic information, etc.). The item nodes can include item-related information and/or features (e.g., reviews, rating, category, etc.). The heterogeneous graph convolution network 506 illustrates relevance and distance between the various nodes.

Figure 5B:
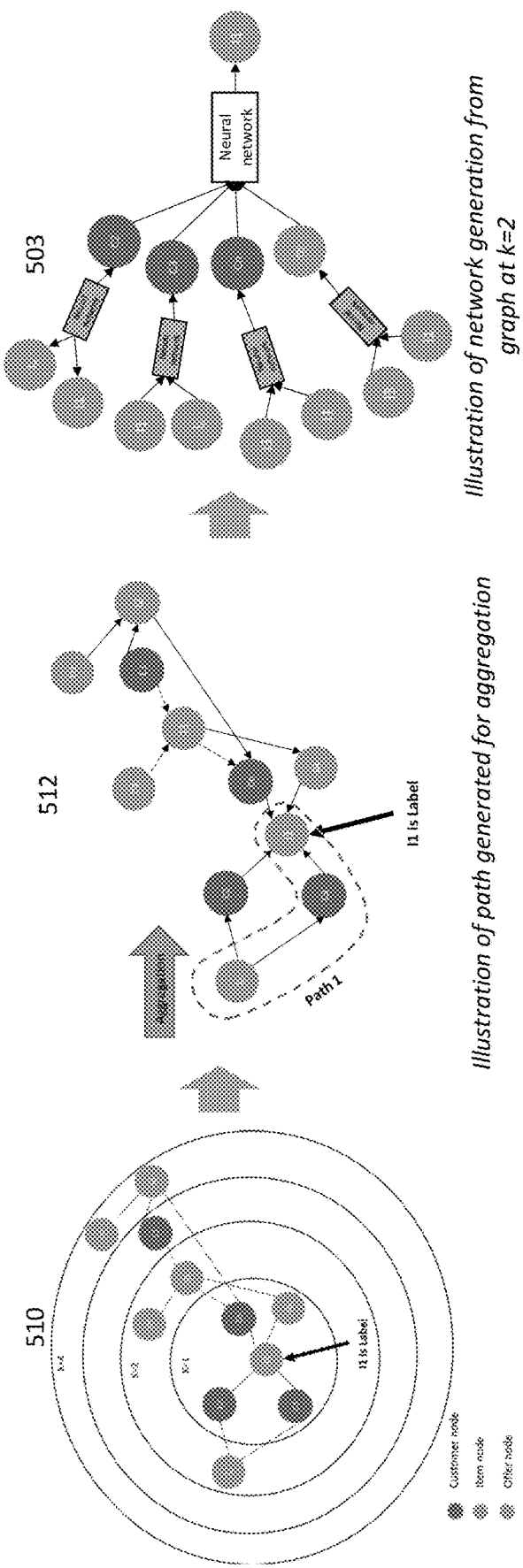
FIG. 5B is a schematic illustration of using a heterogeneous graph convolution network to capture relevance across users and items, according to an embodiment.

As shown in FIG. 5B, using the heterogeneous graph convolution network to capture relevance across users and items can involve (a) sampling neighborhoods on the heterogeneous graph convolution network 510; (b) aggregating feature information 512 from neighbors defined based on parameter k; and (c) predicting graph context and an optimize label using the aggregated features 503 and deep learning using a machine learning model, such as a convolution network. In some implementations, the neighborhoods can be defined by parameter k, which identifies the connected nodes that are eligible for aggregation.

In some instances, the item recommender 117 can use a neural network model to generate node embeddings and link embeddings of the heterogeneous graph convolution network. The neural network can receive input data including a set of labeled users and/or a set of labeled items and generate the node embeddings and the link embeddings. In some instances, each labeled user from the set of labeled users can include a representation of a user and features (e.g., age, income, etc.) associated with the user. In some instances, each labeled item from the set of labeled items can include a representation of an item and features (e.g., price, brand, etc.) associated with the item. In some instances, the neural network can include a Heterogeneous GraphSAGE (HinSAGE) layer and can generate or predict the node embeddings (e.g., user nodes, item nodes, etc.) and link embeddings.

Using the heterogeneous graph convolution network, the item recommender 117 can generate a set of user product recommendations (e.g., item-offer pairwise recommendations) and evaluate a relevance score for each user product recommendation. The recommendation device 110 can be configured to present a subset of user product recommendations from the set of user product recommendations that have relevance scores above a preset threshold.

Figure 6:
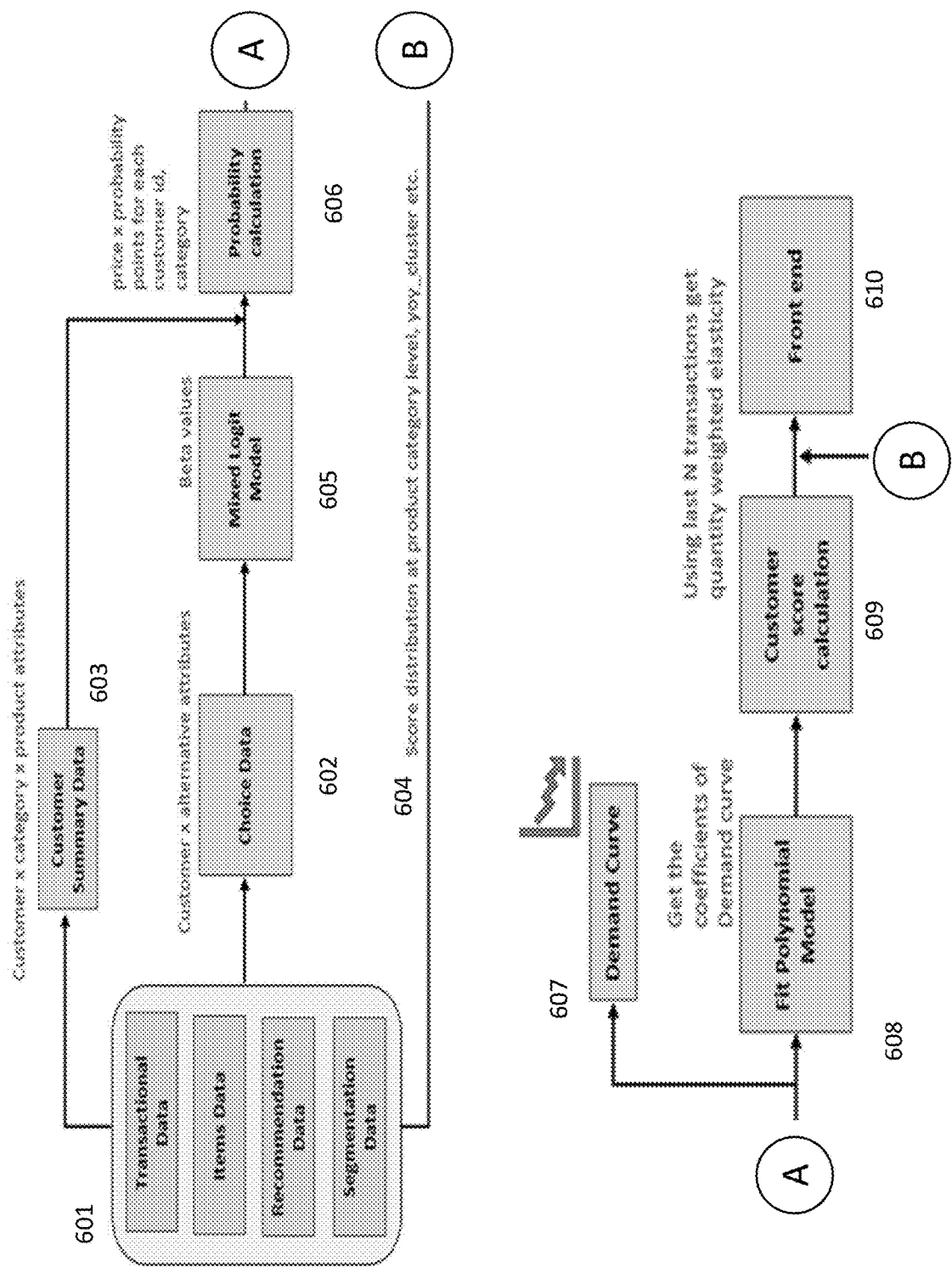
FIG. 6 is a schematic illustration of evaluating a user's elasticity, according to an embodiment.

The elasticity calculator 118 can calculate a user elasticity for each user based on that user's response to price shifts for different products. In some instances, a degree of response to price shifts can be quantified as user elasticity. As shown in FIG. 6, the elasticity calculator 118 can use data 601 including the heterogeneous data, the feature table generated by the feature engineer 115, the user segments generated by the segment generator 116, and/or the user product recommendations generated by the item recommender 117 to generate choice data 602 (e.g., choice data is shown in 701 of FIG. 7 and can include information of item purchased and other items identified during the transaction, generated through item recommender), customer summary data 603 (e.g., customer summary data 603 is shown in 702 of FIG. 7 and can integrate customer, item and category related features generated through structured or un-structured information such as product reviews around but not limited to item, category, competitors, price information, etc.), and/or score distribution at product category level 604 (e.g., score distribution is shown in 703 of FIG. 7 and is captured at customer and category level). The granularity of score distribution 604 can be varied based on problem and data availability.

A mixed logit model 605 (e.g., a binomial regression model, a mixed regression model, and/or the like) can be used to calculate probability values 606 for the choice data 602. The model can generate a demand curve 607 based on the probability values 606 and the customer summary data 603. In some instances, the demand curve can be fitted by a polynomial model 608 to calculate a set of coefficients of the demand curve and thereafter calculate a set of customer scores 609. The set of customer scores 609 and score distribution at product category level can be used to quantify weighted elasticity scores. In some instances, for example, the elasticity for a customer can be computed as the ratio of change in the customer's purchasing probability with respect to change in price as in Eq. (1)

$$\text{Customer Elasticity Score} = \frac{\text{Change in Purchasing probability}}{\text{Change in Price}} \quad (1)$$

In some instances, for example, the purchasing probability for a customer for the customer's $i^{th}$ category can be computed as in Eq. (2)

$$\text{Purchasing probability} = \frac{U_i(\text{Price})}{\sum_{i=1}^{c} Ui(\text{Price})} \quad (2)$$

where, U is the utility function relation between beta obtained from mixed logit model 605 and a defined price point. An example form of the utility function is shown in Eq. (3)

$$U = e^{(beta \times price)} \quad (3)$$

Figure 11:
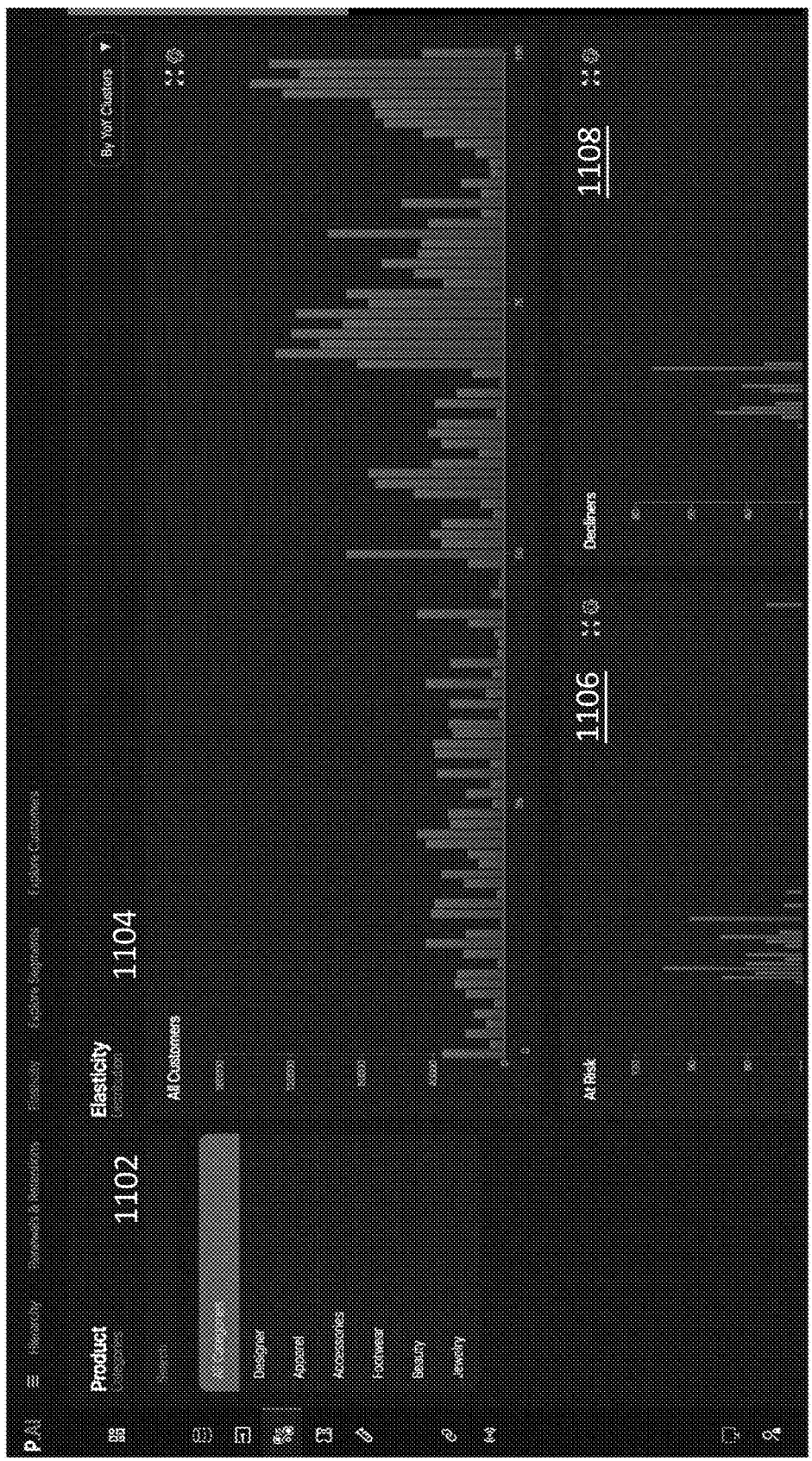
FIG. 11 is an illustration of a user interface showing a distribution of customer level elasticity scores, according to an embodiment.

The weighted elasticity score can be weighted for a specific number of past transactions of a customer. In one example, the weighted elasticity score can be calculated based on the past 10 transactions of the customer. In another example, the weighted elasticity score can be calculated for the transactions of the customer during the previous year. In some instances, the weighted elasticity scores can be displayed to a user of the recommendation device 110 at a front end 610 (e.g., a graphical user interface of the recommendation device 110 and/or of the computing device 160) to inform the user and/or prompt the user to verify the weighted elasticity score. FIG. 11 (user interface 1100) is an illustration of a user interface showing a distribution of customer level elasticity scores, according to an embodiment. As shown in FIG. 11, such scores can be segmented and/or viewed by different product categories. These product categories can be inputted and/or filtered by the end-user (1102).

The system may not limit elasticity calculations based on price. In other examples, the system may use communication as the attribute used to calculate elasticity. For instance, the system may analyze email communication with potential leads and determine whether an additional communication will affect the lead's propensity to purchase a product (e.g., whether a fourth time that a lead receives an email would cause the lead to make a purchase). Therefore, elasticity may refer to a change of behavior based on any marketing intervention (with or without a price point).

The user interface 1100 may include a distribution of the elasticity score among different users (1104). The end-user may view elasticity distributions within different groups. For instance, the system may display elasticity among the "decliner" segment of customers (1108) or "at-risk" customers (1106).

Returning to FIG. 1, the uplift calculator 119 can calculate uplift scores to evaluate the impact of promotions or marketing campaigns on the users based on the elasticity scores of the users. In some instances, the uplift score between two price points A and B where A is the base price and B is the impact in price due to promotions or marketing campaigns can be calculated as a difference in purchasing probability as computed using Eq. (2). The uplift calculator 119 can include a machine learning framework (e.g., a machine learning model such as a neural network, decision tree, random forest, and/or the like) that generates an uplift score based on the status of an offer (e.g., a recommendation, a promotion, a marketing campaign, and/or the like) to a new user and the elasticity score of that user. The uplift score indicates a probability of purchase by the new user if the offer is made to the new user and/or if the offer is not made to the new user. Therefore, the uplift calculator 119 can differentiate between users that are persuadable by the offer from users that are loyal and less dependent on the offer.

The machine learning framework can be trained based on historical data about users and offers to the users, including transactions, user profiles, history of accepted offers by that user, history of types of the offer accepted by that user, history of the medium of offers accepted by that user, campaign data targeting segments generated by the segment generator 116, recommendations generated by the item recommender 117, and/or the like. Thereafter, the uplift calculator 119 can use constraint-based optimization to identify a subset of users that generate maximum incremental revenues to meet the business objectives. In some implementations, the processor 113 can then use the uplift scores to provide offers and/or promotions to one or more users (e.g., send specific offers to the mobile phone of a user). In some implementations, the processor 113 can provide the uplift scores to computing device 160 such that an operator of the computing device 160 can determine to provide offers and/or promotions to one or more users.

Figure 12:
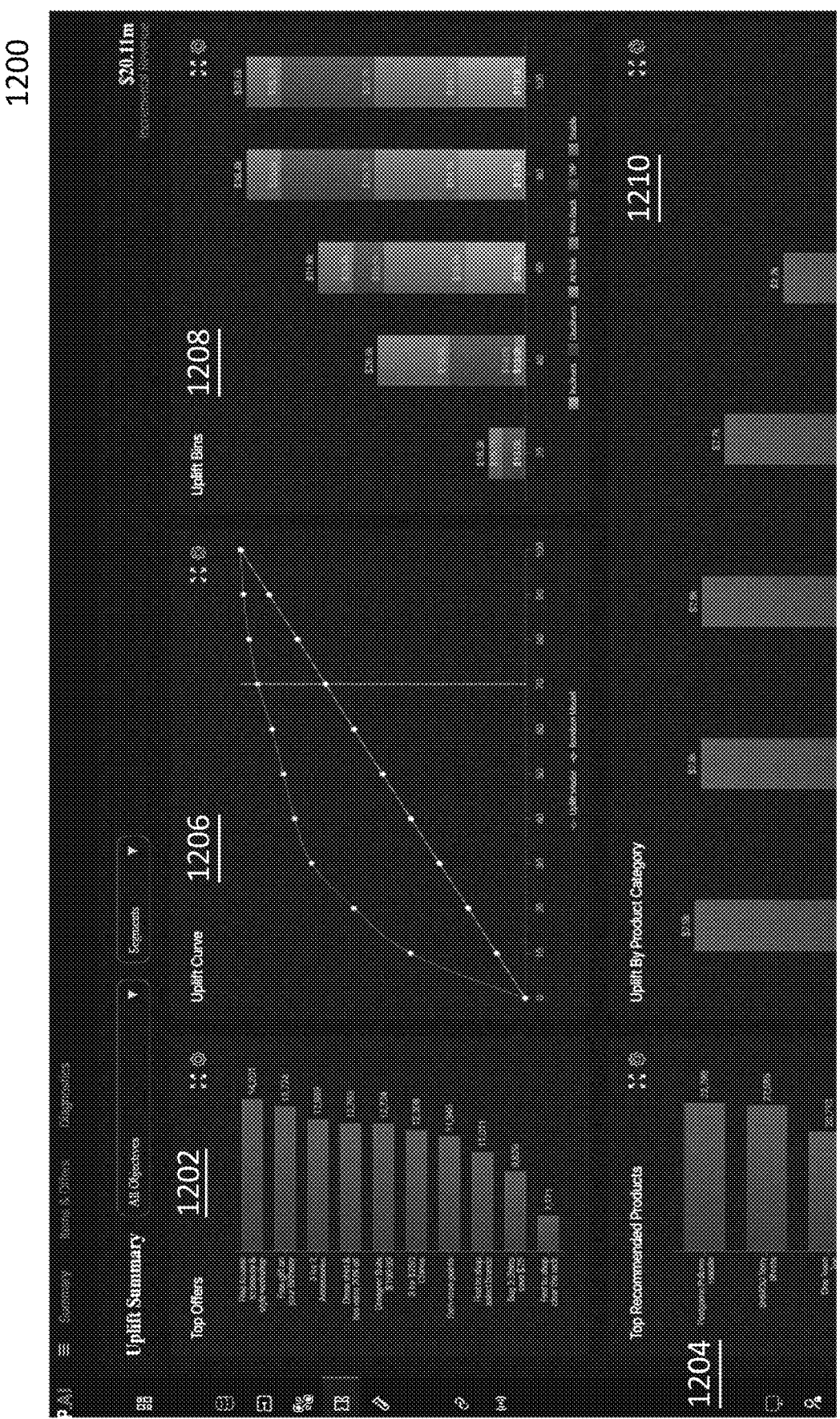
FIG. 12 is an illustration of a user interface summarizing items and offers, according to an embodiment.

FIG. 12 is an illustration of a user interface 1200 summarizing items and offers, according to an embodiment. The user interface 1200 allows a user to view a detailed snapshot of personalized recommendations and offers, their impact on the business, and underlying model diagnostics. For example, the user interface of FIG. 12 allows a user to view top offers (1202), top recommended products (1204), and uplift information. The user interface 1200 may display an uplift curve comparing the uplift model to a random model (1206). As a result, the end-user may view how an offer or a marketing intervention can affect uplift. The user interface 1200 may also be a chart 1208 that displays uplifts in accordance with a bin of customers/users showing uplift based on user categories (e.g., incliners, decliners, at risk, win back, VIP, stable). The user interface 1200 may also include a graphical representation 1210 that displays an uplift distribution classified by product category.

Although each of the data preprocessor 114, the feature engineer 115, the segment generator 116, the item recommender 117, the elasticity calculator 118, and the uplift calculator 119 are shown as part of and described as executed by the recommendation device 110, in some embodiments, one or more of the data preprocessor 114, the feature engineer 115, the segment generator 116, the item recommender 117, the elasticity calculator 118, and the uplift calculator 119 can be transmitted to and executed at the computing device 160 and/or the server 170.

The computing device 160 can be operatively coupled and configured to transmit and/or receive data and/or analytical models to the recommendation device 110. A user of computing device 160 can use the recommendation device 110 (partially or fully) for an item recommendation (e.g., item-offer pairwise recommendations), opportunity monitoring, and/or estimating customer elasticity. In some instances, the computing device can be/include, for example, a personal computer, a laptop, a smartphone, a custom personal assistant device, and/or the like. The computing device 160 includes a memory 162, a communication interface 163, and a processor 164 that can be structurally and/or functionally similar to the memory 111, communication interface 112, and the processor 113 of the recommendation device 110, respectively. In some instances, the user can use the computing device 160 to interact with the recommendation device 110 to obtain item recommendations (e.g., item-offer pairwise recommendations), view elasticity scores and/or uplift scores of a user or set of users, and/or visualize generated segments of customers.

The server 170 can be/include devices specialized for data storage purposes and/or computing purposes that can include, for example, a network(s) of memories, a network(s) of processors, a server(s), a blade server(s), a storage area network(s), network-attached storage(s), deep learning computing servers, deep learning storage servers, and/or the like. The server 160 includes a memory 172, a communication interface 173, and a processor 174 that can be structurally and/or functionally similar to the memory 111, communication interface 112, and the processor 113 of the recommendation device 110, respectively. While shown in FIG. 1 as being executed at the recommendation device 110, in some implementations the server 170 can be configured to execute the segment generator 116, the item recommender 117, the elasticity calculator 118, and/or the uplift calculator 119. In another example, the server 170 can store data and can be configured to execute the data preprocessor 104 and/or the feature engineer 115.

The network 150 can be a digital telecommunication network of servers and/or computing devices. The servers and/or computing devices on the network can be connected via one or more wired or wireless communication networks (not shown) to share data and/or resources such as, for example, data storage and/or computing power. The wired or wireless communication networks between servers and/or computing devices of the network 150 can include one or more communication channels, for example, a radio frequency (RF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

Although, the recommendation device 110, the computing device 160, and the server 170 are shown and described as singular devices, it should be understood that, in some embodiments, one or more recommendation devices, one or more computing devices, and/or one or more servers can be used.

Although the data preprocessor 114, the feature engineer 115, the segment generator 116, the item recommender 117, the elasticity calculator 118, and the uplift calculator 119 are shown and described in a singular device, it should be understood that, in some embodiments, multiple devices can be used to process and/or execute the functions of the data preprocessor 114, the feature engineer 115, the segment generator 116, the item recommender 117, the elasticity calculator 118, and the uplift calculator 119. For example, in some embodiments, a first recommendation device can be used to execute the data preprocessor 114, the feature engineer 115, and the segment generator 116, and a second recommendation device can be used to execute the item recommender 117, the elasticity calculator 118, and the uplift calculator 119.

Figure 2:
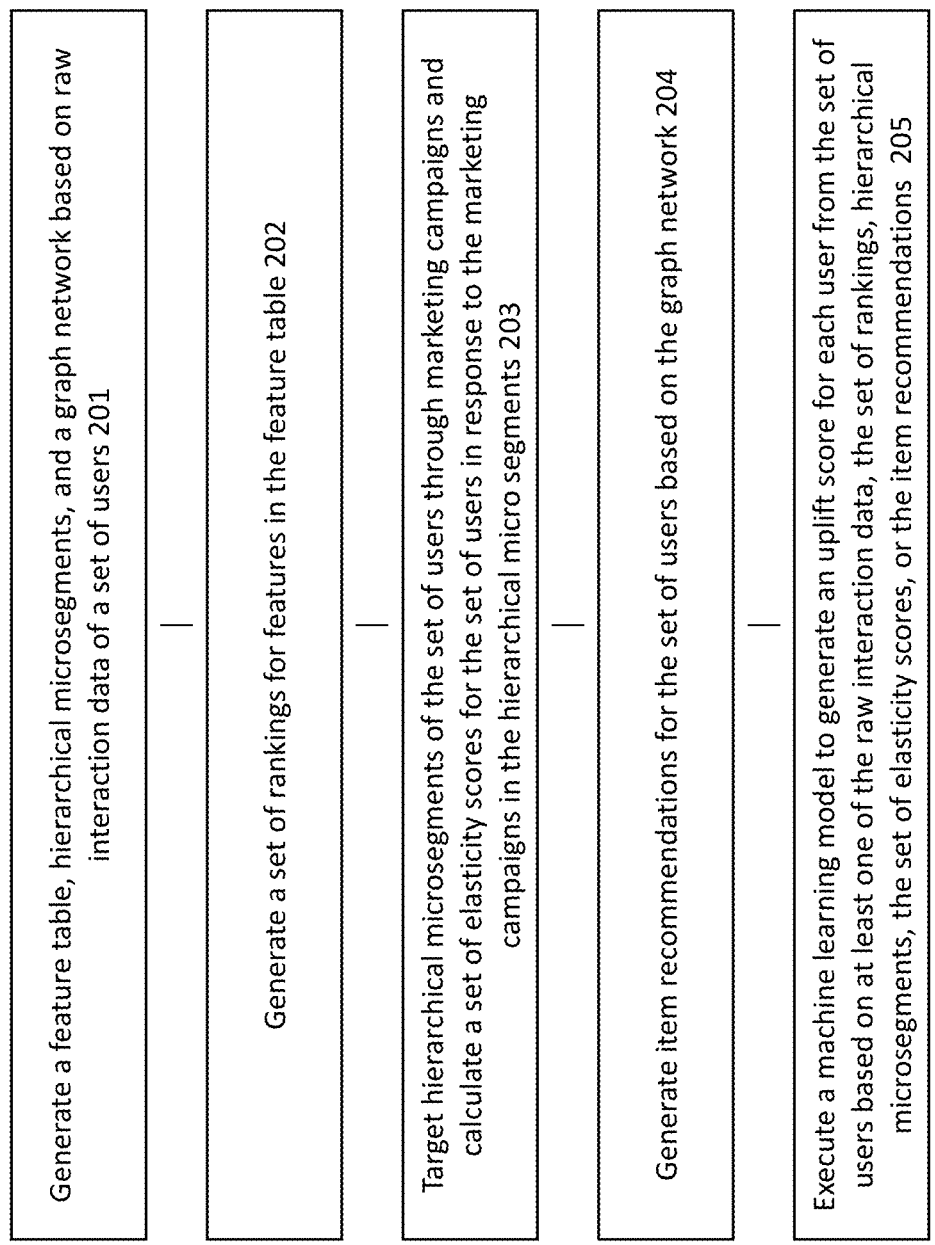
FIG. 2 is a flowchart illustrating a method of generating a recommendation, according to an embodiment.

FIG. 2 is a flowchart illustrating a method 200 of generating a recommendation, according to an embodiment. The method 200 can be performed by a processor of a recommendation device (such as the processor 113 of the recommendation device 110 as shown and described with respect to FIG. 1). The method 200 can include generating, at 201, a feature table, hierarchical segments, and a graph network based on raw interaction data of a set of users. The raw interaction data can be heterogeneous data including multiple data types and originating from a variety of sources. For example, the raw interaction data can include user transactional data, campaign data, marketing touchpoint data, loyalty information, geographical data, behavioral data, user segments, de-identified user encoding as vector representation data, and/or the like. The method 200 can include generating, at 202, a set of rankings for features in the feature table. The recommendation device can use a genetic algorithm that searches the raw interaction data or preprocessed data (as described with respect to FIG. 1) and evaluates the fitness of the features to select the fittest features and generate subsequent features based on mutations of each iteration of the genetic algorithm.

The method 200 can include targeting, at 203, hierarchical segments of the set of users through marketing campaigns and calculating a set of elasticity scores for the set of users in response to the marketing campaigns in the hierarchical segments. The recommendation device can use hierarchical tessellation (e.g., Hierarchical Voronoi Tessellation (HVT)) to identify user segments. Therefore, the recommendation device can target user segments with specific offers or campaigns and generate new sub-segment offers or campaigns based on previously established user segments.

The set of elasticity scores can be generated at the user level (e.g., an elasticity score for each customer in a set of customers of a store) to define the ability of the user to be impacted by price movements. In some instances, the set of elasticity scores can be defined for aggregations such as segment level, business unit level, and/or the like and can be computed using Eq. (1). In some embodiments, the set of elasticity scores can be used to calculate a threshold for identifying segments for the offers and the campaigns. The threshold to identify a segment can be conducted using optimization $$\mathrm{argmax}_\varphi(\mathrm{KPIs})\ \mathrm{s.t.}\ |P|\mathord{<}\mathord{=}\mathrm{size} \quad (4)$$

where, $\varphi$ is the elasticity threshold and KPIs are selected KPIs for segment creation such as revenue, engagement, etc. The $|P|$ represents the cardinality of a selected segment and size is the maximum size of the segment. The optimization can be performed using integer linear programming. The recommendation device can then assess the elasticity of the segments based on price movements.

The method 200 can include generating, at 204, item recommendations (e.g., item-offer pairwise recommendations) for the set of users based on the graph network. In some implementations, the graph network can be a heterogeneous graph convolution network constructed based on the feature table. The graph network can capture relevance across users and items in a single graph by leveraging node embedding neighborhood. The recommendation device can generate a set of user product recommendations and evaluate a relevance score for each user product recommendation.

The method 200 can include executing, at 205, a machine learning model to generate an uplift score for each user from the set of users based on at least one of the raw interaction data, the set of rankings, hierarchical segments, the set of elasticity scores, or the item recommendations. The uplift score indicates a probability of a purchase by the new user if an offer (e.g., item-offer pair) is made to the new user and/or if the offer is not made to the new user. Therefore, the recommendation device can use the uplift score to differentiate between users that are persuadable by the offer from users that are loyal and less dependent on the offer.

In some embodiments, the method 200 can optionally include performing A/B testing (e.g., split testing) to test the impact of the offer (e.g., item-offer pair) in offline mode or online mode. In some instances, the A/B testing can be performed in stages. At each stage impact of the A/B testing can be evaluated, based on an objective function, to generate a score, and offers for the next A/B testing stages thereafter can be defined based on the score. The A/B testing can display the offers on a range of mediums such as, for example, a mobile phone app, a web site, an interactive kiosk, a television screen, and/or the like.

Figure 13:
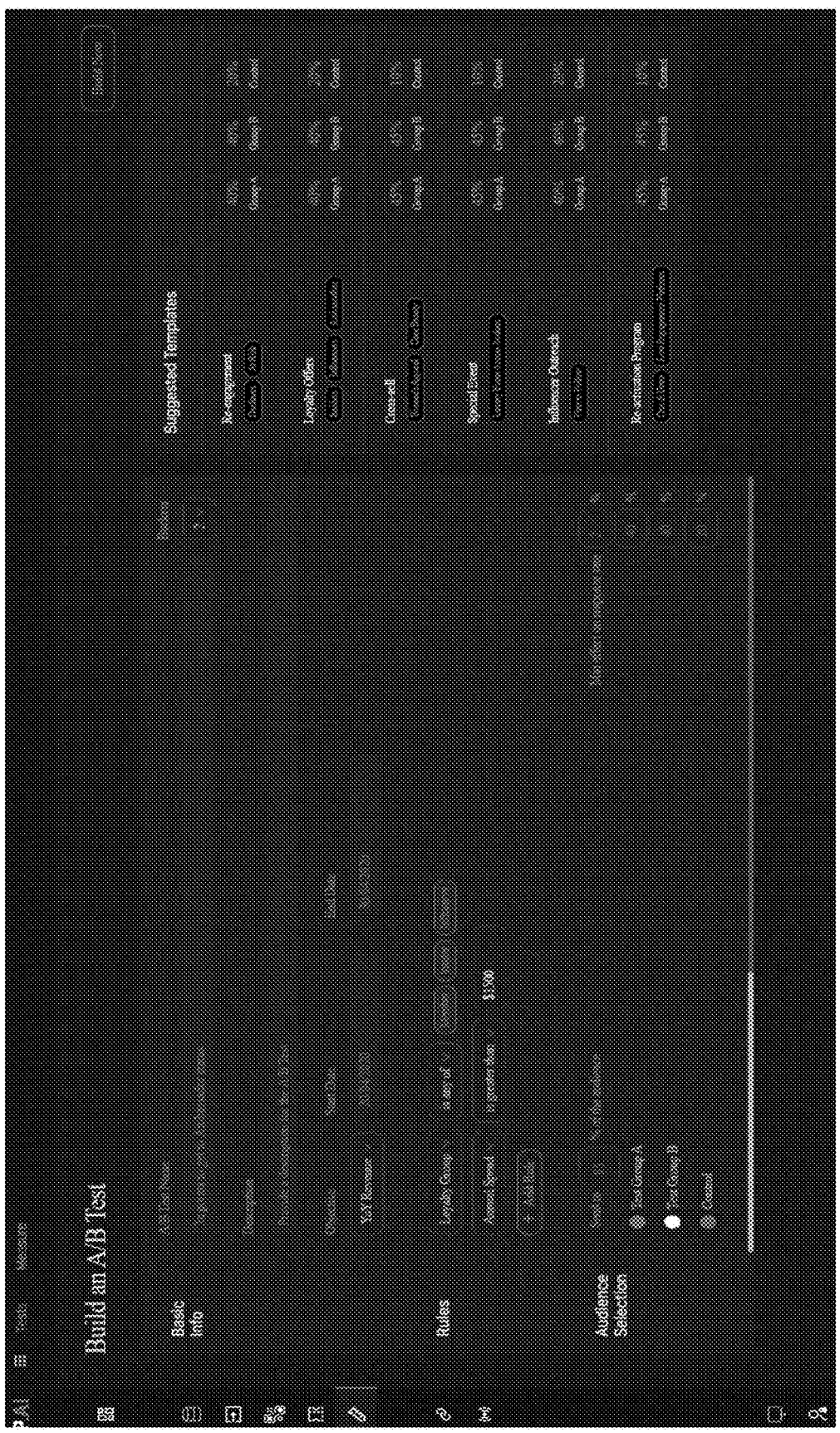
FIG. 13 is an illustration of a user interface to build an A/B test, according to an embodiment.
Figure 14:
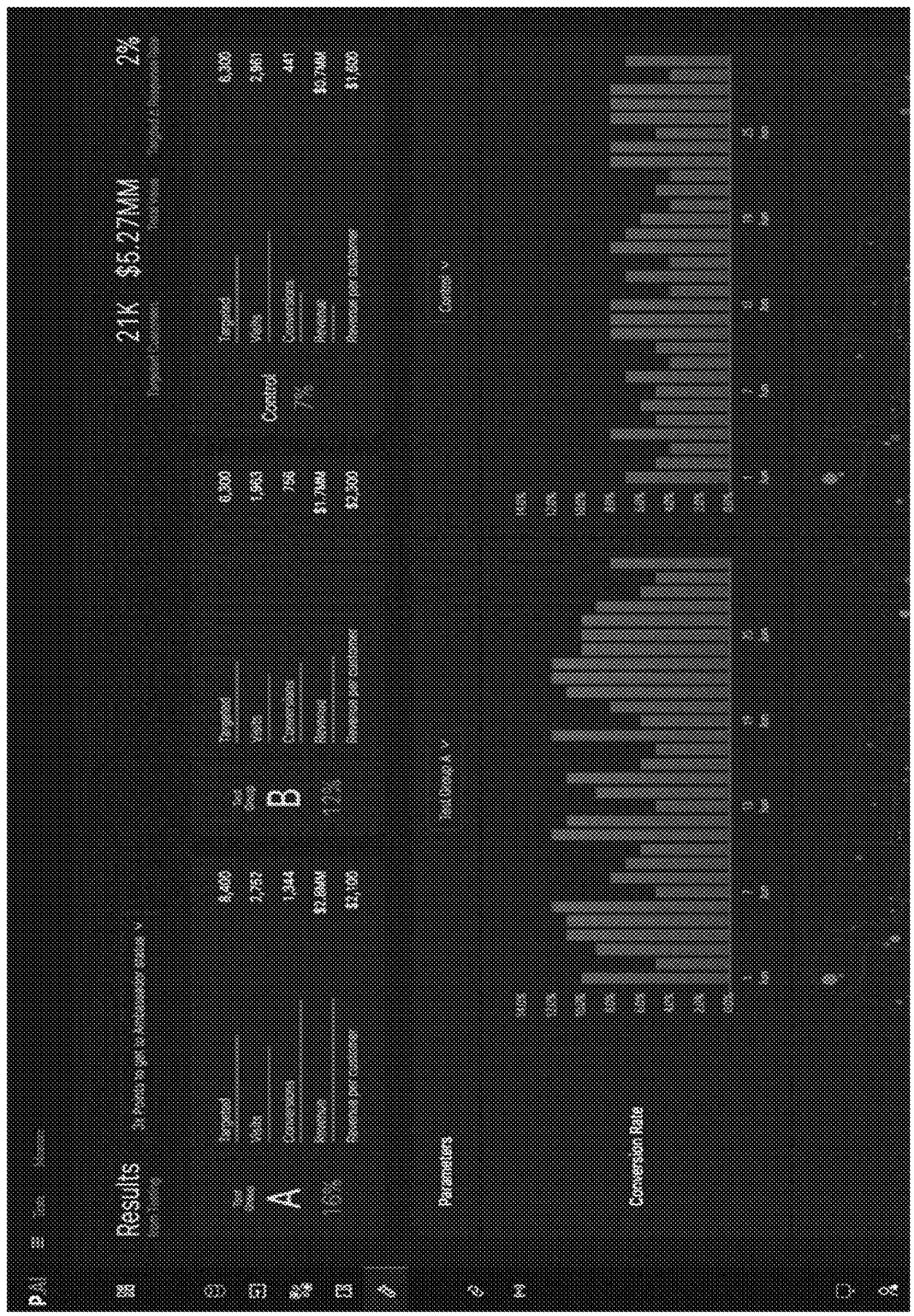
FIG. 14 is an illustration of a user interface to view results of an A/B test, according to an embodiment.

For example, a recommendation device can perform the A/B testing by displaying the first pair of car insurance offers to two segments of 22 years old car owners in Georgia and California using advertisements on mobile phone apps and/or television screens. The recommendation device can evaluate responses from the two segments and generate a second pair of car insurance offers targeting the two segments or two other segments similar to the two segments. The recommendation device can continue generating new offers based on responses from previous offers until a predetermined objective is reached. In some implementations, the results of such A/B testing can be used to train and/or refine the machine learning models used herein (e.g., as used by the processor 113). FIG. 13 (user interface 1300) is an illustration of a user interface to build an A/B test. Such an interface allows a user to select an objective, a start and end date, rules for the test, and selection of an audience for the test (test group A, test group B or control). FIG. 14 (user interface 1400) is an illustration of a user interface to view the results of an A/B test. Such A/B testing allows a user to test the efficacy of recommendations.

The acts performed as part of a disclosed method 200 can be ordered in any suitable way. Accordingly, embodiments can be constructed in which processes or steps are executed in an order different than illustrated, which can include performing some steps or processes simultaneously, even though shown as sequential acts in illustrative embodiments.

Figure 3:
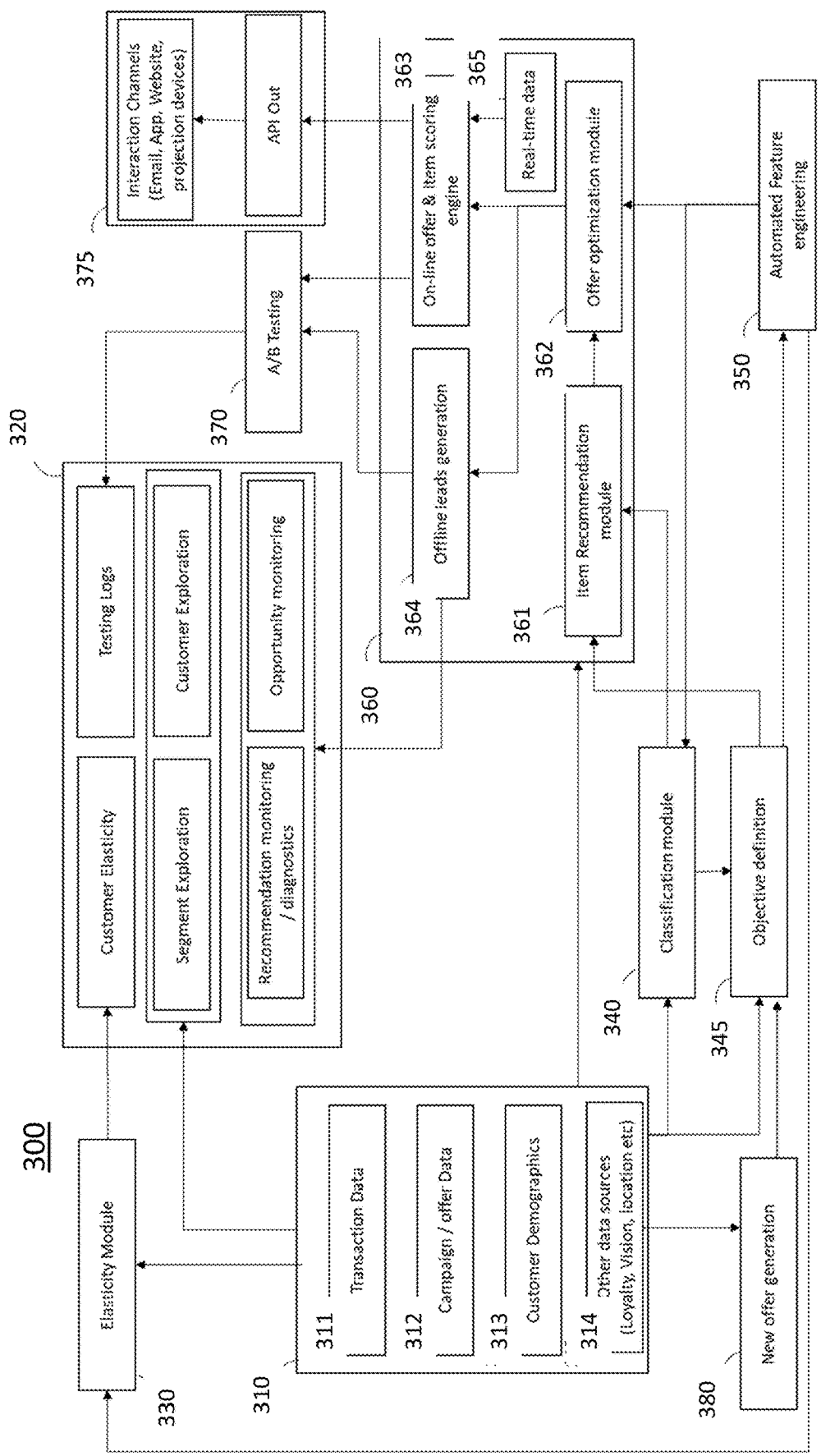
FIG. 3 is a schematic illustration of a flow of data through components of a recommendation system, according to an embodiment.

FIG. 3 is a schematic illustration of the flow of data through components of a recommendation system 300, according to an embodiment. The functions and/or components described with respect to FIG. 3 can be executed on devices such as the recommendation device 110, the computing device 160 and/or the server 170, shown and described with respect to FIG. 1. The recommendation system can include a data source component 310 (e.g., an internal memory, an external memory, a data server, and/or the like) that stores heterogeneous data including, for example, transaction data 311, social media data, campaign and offer data 312, customer demographic data 313, geological and loyalty data 314, medical data, and/or the like.

The heterogeneous data can be processed by offer generator 380 to generate new offers, by classification module 340, and by objective function 345 for automated feature engineering 350 that generates features. The objective function 345 can be used to define objectives (e.g., business objectives, maximizing profit, maximizing reach, etc.). The objectives can be defined by a user using the objective functions 345 and can be used at various components of the recommendation system to generate features, segments, and/or item recommendations (e.g., item-offer pairwise recommendations).

The features and/or the heterogeneous data can be sent to a recommendation component 360 that can be configured to generate item recommendations 361, generate offline leads 364, fetch real-time data 365 to generate online offers using online offer and item scoring engine 363, and optimize offers and recommendations 362.

The online offers and the offline leads generated by the recommendation device 360 can be then used by an A/B testing component to test impact of the online offers and the offline leads. The online offers can be presented to the user via an API on a variety of platforms including, for example, email, mobile phone apps, websites, projection devices, and/or the like. The heterogeneous data and the features can be processed by an elasticity device 330 to generate elasticity scores at the user level (e.g., for each customer of a store) that define the impact of price movements on a user. The heterogeneous data can be processed by monitoring component 320 to generate, visualize, and/or explore segments of the users in the heterogeneous data for targeting campaigns and offers. In some instances, the monitoring component can be a set of programs that is part of the recommendation system 300.

In some instances, the monitoring component can be a hardware that is operatively coupled to other components of the recommendation system 300. The monitoring component 320 can further configured to monitor elasticity scores, testing logs from the A/B testing device 370, recommendations generated by the recommendation device 360, opportunities or offers presented to users, and/or the like.

Although devices of the recommendation system 300 are shown and described as separate devices, in some embodiments, the devices can be implemented on a single hardware device (e.g., an integrated circuit) or a software platform (e.g., software on a server device that is accessed via an application programming interface (API)).

FIG. 15 depicts a flowchart illustrating a method 1500 for analyzing user data and generating a recommendation, according to an embodiment. The method 1500 can be performed by any processor or computer discussed and/or shown herein, for example, in FIG. 1. For instance, the method 1500 can be performed by a processor of a prediction or recommendation device (such as the processor 113 of the recommendation device 110 as shown and described with respect to FIG. 1), a processor of the user device 160, and/or the server device 170. Therefore, for brevity, the method 1500 is described as being performed by a system, such as the system 100.

In some configurations, one or more steps of the method 1500 may be performed by different computing devices discussed herein. For instance, a processor of the recommendation device 110 may perform one or more steps of the method 1500 and a processor of the computing device 160, and/or the server 170, may perform one or more other steps of the method 1500.

Moreover, the method 1500 is not limited to the depicted and described order. For instance, one or more of the steps of the method 1500 may be performed in a different order and at different times. Therefore, the method 1500 may be performed partially and asynchronously (or sometimes synchronously) by different computer devices discussed herein.

In a non-limiting example, the recommendation device 110 embodies a software as a service (SaaS). For instance, when a user device inputs a request to view a recommendation, the prediction device 110 may perform various steps of the method 1500 to analyze user data and generate a recommendation or display any of the user interfaces discussed herein.

At step 1502, the system may generate a graph corresponding to a set of features extracted from a set of data associated with the activities of a set of users. As discussed herein, the system may collect and/or aggregate user data. The system may then process and analyze the user data to generate various predictive attributes, such as item recommendations and uplift values. Using this data, the system may also segment the users accordingly, for instance, based on a calculated elasticity. As discussed herein, user data may correspond to data associated with a set of users' activities and interactions, which can be collected from disparate data sources and may belong to different formats. Therefore, the data collected may be heterogeneous. For instance, the heterogeneous data can include a user's journey or history data, in-store visit data, promotion data, clickstream data, financial transaction data, medical data, social media data, behavioral data, and/or the like.

In some configurations, the system may preprocess the data before generating the features. For instance, the heterogeneous data may be normalized, dimensionally reduced, and/or aggregated. After preprocessing, the system may extract various features from the heterogeneous user data. In some embodiments, the system may generate a feature table from the feature space that corresponds to the user data. Using the methods and systems described herein, such as the feature engineer 115 as depicted and described in FIG. 1, the system may generate the features.

In some configurations, the system may evaluate the generated features as well. For instance, the fitness and impact of a feature may be evaluated, such that features are ranked in accordance to how important or how fit they are.

As described herein, in some configurations, the system may only use features that satisfy various quality thresholds. For instance, the system may rank the features (in accordance with their impact or fitness) and may only use the features that are within the top 50%. In this way, the system ensures that the overall results are more accurate.

The system may generate a graph that corresponds to the set of generated features and/or the underlying data. The graph may be a nodal data structure where different nodes represent different aspects of the data (e.g., raw interaction data). The nodes may be arranged in accordance with their category or the information they represent. For instance, the nodes may be arranged based on whether they represent data associated with customers or offers. A non-limiting example of a graph is depicted and described in associated with FIGS. 5A-B.

At step 1504, the system may calculate a set of elasticity scores for at least a subset of users within the set of users corresponding to a segment of the set of users responding to a targeted marketing campaign.

The system may first generate one or more segments of the set of users. As used herein, a segment may include any portion of the users that satisfy one or more attributes. For instance, the system may divide the set of users into different segments based on their respective income (e.g., the attribute is income). In some embodiments, the attributes used to segment the users may be attributes derived by the system. For instance, the system may divide the set of users based on various business objectives, such as based on revenue generated from each segment (e.g., different segments of the set of users are projected to generate different revenues for an entity). The system may use the segment generator 116 to achieve this objective.

In some configurations, the segments may be hierarchical. Therefore, each segment may include one or more sub-segments and those sub-segments may be divided into more sub-segments as well. Segmenting users may be automatic or user-driven. In some configurations, attributes of each segment and/or a number of segments may be received from an end-user operating a client computing device. For instance, an end-user may request that the system segments the users based on their income. In another embodiment, the system may automatically segment the data multiple times until it reaches a unique subset of users.

Using the methods and systems described herein, users can be divided into hierarchical segments. Therefore, users can be iteratively divided into segments and sub-segments based on AI-backed classifications until a unique cohort of users for which a different marketing intervention is identified.

After dividing the set of users into multiple segments (that may or may not be hierarchical, the system may generate one or more elasticity scores for the users (or at least a portion of the users) within each segment. The system may use the elasticity calculator 118 to generate the elasticity values. The system may calculate the user elasticity for each user based on that user's response to price shifts for different products. In some instances, a degree of response to price shifts can be quantified as user elasticity. However, as described herein, elasticity is not limited to price-associated data. In some embodiments, elasticity may correspond to user behavior change with respect to marketing campaigns (e.g., number of offers, changing communication channels, and the like).

At step 1506, the system may generate an item offer recommendation for at least a user within the subset of users. After dividing the set of users into multiple segments (that may or may not be hierarchical), the system may generate one or more recommendations for the users within each (or at least a portion of) segment. The system may receive an indication of an item (e.g., from an end-user operating a platform or a user interface provided by the system) and may analyze the item and the data for the users within one or more segments to generate a recommendation. The system may use the item recommender 117 to achieve this result. The system may analyze the graph generated based on the features extracted and may generate a recommendation for the item.

The recommendation, in some configurations, may be generated via one or more computer models that use machine learning and artificial intelligence methodologies. For instance, the item recommender may use a neural network to achieve these results. Therefore, the system may use AI-enabled methods as well as non-AI-enabled methods and models.

In some configurations, the system may calculate the elasticity score after generating the item recommendations. For instance, the system may generate the elasticity for one or more users in light of each respective user's segment, their interaction data, and their item recommendation (with respect to the recommended course of actions). Therefore, the order of calculations depicted in FIG. 15 is not limiting.

At step 1508, the system may execute a machine learning model to generate an uplift score for at least one user within the subset of users based on at least one of the graph, the set of data, or the set of elasticity scores. The system may analyze the user data considered and/or predicted/generated in steps 1502-1506 and the heterogeneous user data (collected as a result of the set of users' interactions) to generate an uplift score for one or more users within the segments. The uplift score may indicate an impact of promotions or marketing campaigns on the users (within the segments). To calculate the uplift score, the system may use the uplift calculator 119 depicted and described in FIG. 1. To calculate the uplift, the system may use a variety of methods including AI-enabled methods and models. For instance, the system may utilize a neural network that has been trained using historical data indicating how previous users (with the same or similar attributes) reacted.

The machine learning model may ingest all or part of the data (e.g., raw interaction data, features derived, and various other collected, monitored, and/or calculated attributes described throughout) to generate the uplift score. Therefore, the machine learning model may use different (or sometimes unique) combinations of data to calculate uplift scores. For instance, the machine learning model may use different data to calculate uplift for one segment of customers when analyzing a discount than when calculating uplift for a different segment of customers when analyzing sending an email coupon. The machine learning model may calibrate itself to identify a combination of data that would yield the most accurate result and may use that unique combination.

The system may present one or more of the predicted and/or analyzed variables and attributes discussed herein on a user interface, such as depicted in FIGS. 8-14.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field-programmable gate array (FPGA), and/or an application-specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:
   generating, by a processor, a graph corresponding to a set of features extracted from a set of data associated with activities of a set of users;
   calculating, by the processor, a set of elasticity scores for a subset of users within the set of users corresponding to a segment of the set of users responding to a targeted marketing campaign, each of the set of elasticity scores being a numeric value representing a magnitude of change in purchasing probability for a respective user of the subset of users relative to a magnitude of change in price indicated in the targeted marketing campaign;

generating, by the processor, an item offer recommendation for at least a user within the subset of users;

training, by the processor, a neural network based at least on historic offers provided to historic users and a subset of the historic offers that were accepted by the historic users, the neural network trained to generate uplift scores as output using at least one or more elasticity scores as input, the uplift scores representing an impact on purchasing probability for one or more users due to offers being presented to the one or more users; and generating, by the processor, an uplift score for at least one user within the subset of users by executing the trained neural network and using at least one elasticity score of the calculated set of elasticity scores corresponding to the at least one user.

2. The method of claim 1, wherein the set of data comprises at least one of user transactional data, campaign data, marketing touchpoint data, loyalty information, geographical data, behavioral data, user segments, or de-identified user encoding data.

3. The method of claim 1, wherein the set of data corresponds to heterogeneous data including at least one of multiple data types or originating from one or more data sources.

4. The method of claim 1, further comprising receiving, by the processor, a number of segments for which to calculate elasticity scores from a client computing device.

5. The method of claim 1, further comprising receiving, by the processor, an attribute of the segment from a client computing device.

6. The method of claim 1, further comprising calculating, by the processor, using the set of elasticity scores, a threshold for identifying the segment.

7. The method of claim 1, wherein the uplift score indicates an impact of the targeted marketing campaign on the at least one user.

8. The method of claim 1, further comprising:

ranking, by the processor, each feature within the set of features, wherein the processor uses a subset of the set of features in accordance with their respective ranking to generate the graph.

9. The method of claim 1, further comprising:

presenting, by the processor for display on a user interface, a graphical indication of a distribution of elasticity score among at least a portion of the set of users.

10. The method of claim 1, further comprising:

presenting, by the processor for display on a user interface, a graphical indication of a distribution of uplift scores among at least a portion of the set of users.

11. A computer system comprising:

a server having at least one processor configured to:

generate a graph corresponding to a set of features extracted from a set of data associated with activities of a set of users;

calculate a set of elasticity scores for a subset of users within the set of users corresponding to a segment of the set of users responding to a targeted marketing campaign, each of the set of elasticity scores being a numeric value representing a magnitude of change in purchasing probability for a respective user of the subset of users relative to a magnitude of change in price indicated in the targeted marketing campaign;

generate an item offer recommendation for at least a user within the subset of users;

train a neural network based at least on historic offers provided to historic users and a subset of the historic offers that were accepted by the historic users, the neural network trained to generate uplift scores as output using at least one or more elasticity scores as input, the uplift scores representing an impact on purchasing probability for one or more users due to offers being presented to the one or more users; and generate an uplift score for at least one user within the subset of users by executing the trained neural network and using at least one elasticity score of the calculated set of elasticity scores corresponding to the at least one user.

12. The computer system of claim 11, wherein the set of data comprises at least one of user transactional data, campaign data, marketing touchpoint data, loyalty information, geographical data, behavioral data, user segments, or de-identified user encoding data.

13. The computer system of claim 11, wherein the set of data corresponds to heterogeneous data including at least one of multiple data types or originating from one or more data sources.

14. The computer system of claim 11, wherein the at least one processor is further configured to receive a number of segments from a client computing device.

15. The computer system of claim 11, wherein the at least one processor is further configured to receive an attribute of the segment from a client computing device.

16. The computer system of claim 11, wherein the at least one processor is further configured calculate, using the set of elasticity scores, a threshold for identifying the segment.

17. The computer system of claim 11, wherein the uplift score indicates an impact of the targeted marketing campaign on the at least one user.

18. The computer system of claim 11, wherein the at least one processor is further configured to rank each feature within the set of features, wherein the at least one processor uses a subset of the set of features in accordance with their respective ranking to generate the graph.

19. The computer system of claim 11, wherein the at least one processor is further configured to present, for display on a user interface, a graphical indication of a distribution of elasticity score among at least a portion of the set of users.

20. The computer system of claim 11, wherein the at least one processor is further configured to present, for display on a user interface, a graphical indication of a distribution of uplift scores among at least a portion of the set of users.

* * * * *